(12) United States Patent
Paiz

(10) Patent No.: US 9,355,352 B1
(45) Date of Patent: May 31, 2016

(54) PERSONAL SEARCH RESULTS

(71) Applicant: Richard Paiz, N. MiamiBeach, FL (US)

(72) Inventor: Richard Paiz, N. MiamiBeach, FL (US)

(*) Notice: Subject to any disclaimer, the term of this patent is extended or adjusted under 35 U.S.C. 154(b) by 207 days.

(21) Appl. No.: 14/028,508

(22) Filed: Sep. 16, 2013

Related U.S. Application Data

(63) Continuation-in-part of application No. 14/013,018, filed on Aug. 28, 2013, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of (Continued)

(51) Int. Cl.
| | |
|---|---|
| *G06F 15/16* | (2006.01) |
| *G06N 3/08* | (2006.01) |
| *G06Q 30/06* | (2012.01) |

(52) U.S. Cl.
CPC ............ *G06N 3/086* (2013.01); *G06Q 30/0635* (2013.01)

(58) Field of Classification Search
USPC .................................. 709/201, 202; 706/14
See application file for complete search history.

(56) References Cited

U.S. PATENT DOCUMENTS

| | | | |
|---|---|---|---|
| 5,025,369 A | 6/1991 | Schwartz | |
| 5,063,506 A | 11/1991 | Brockwell et al. | |
| 5,585,839 A | 12/1996 | Ishida et al. | |
| 5,671,363 A | 9/1997 | Cristofich et al. | |
| 5,762,552 A | 6/1998 | Vuong et al. | |
| 5,790,935 A | 8/1998 | Payton | |
| 5,794,210 A | 8/1998 | Goldhaber et al. | |
| 5,809,282 A | 9/1998 | Cooper et al. | |
| 5,832,069 A | 11/1998 | Waters et al. | |
| 5,873,099 A | 2/1999 | Hogan et al. | |
| 5,878,113 A | 3/1999 | Bhusri | |
| 5,878,127 A | 3/1999 | Fleischer, III | |
| 5,881,269 A | 3/1999 | Dobbelstein | |
| 5,910,981 A | 6/1999 | Bhagat et al. | |
| 5,917,899 A | 6/1999 | Moss et al. | |
| 5,931,901 A | 8/1999 | Wolfe et al. | |
| 6,028,924 A | 2/2000 | Ram et al. | |

(Continued)

FOREIGN PATENT DOCUMENTS

EP  0448800 A1  10/1991

OTHER PUBLICATIONS

Robertson, et al. "Cone Trees: Animated Visualization of Hierarchical Information", 1991.

(Continued)

*Primary Examiner* — Ronald Laneau
(74) *Attorney, Agent, or Firm* — Allen D. Hertz, P.A.; Allen D. Hertz

(57) ABSTRACT

The search engine optimizer transforms input information interactively and works independently and in parallel with a browser and search engine supercomputer. The optimizer reorganizes the input, and provides an optimized version as an output. The output (Optimized, reorganized input) is sent to the search engine, which responds to the end user with search results. The optimizer recognizes each request as a pattern and stores the pattern in an advanced Glyph format. This permits the optimizer to use left brain English language and right brain geospatial key featured association equation to gain factor the best results, and then using deductive reasoning feedback equation attenuate content with confounding variables in order to stabilize and reduces sensitivity parameter variations due to the environment and identify a left and right side human brain checkmate combination required to achieve certitude.

22 Claims, 23 Drawing Sheets

Related U.S. Application Data application No. 12/778,228, filed on May 12, 2010, now Pat. No. 8,239,229, which is a continuation-in-part of application No. 11/584,941, filed on Oct. 23, 2006, now Pat. No. 7,809,659, which is a continuation-in-part of application No. 10/852,394, filed on May 24, 2004, now abandoned, which is a continuation-in-part of application No. 10/603,963, filed on Jun. 25, 2003, now Pat. No. 6,842,511, which is a continuation-in-part of application No. 09/544,238, filed on Apr. 7, 2000, now Pat. No. 6,614,893, application No. 14/028,508, which is a continuation-in-part of application No. 14/013,018, which is a continuation-in-part of application No. 13/777,775, which is a continuation-in-part of application No. 13/247,964, which is a continuation-in-part of application No. 12/785,122, which is a continuation-in-part of application No. 12/146,420, filed on Jun. 25, 2008, now Pat. No. 7,908,263, application No. 14/028,508, which is a continuation-in-part of application No. 14/013,018, which is a continuation-in-part of application No. 13/777,775, which is a continuation-in-part of application No. 13/247,964, which is a continuation-in-part of application No. 12/785,122, which is a continuation-in-part of application No. 10/926,446, filed on Aug. 25, 2004, now Pat. No. 7,050,813, and a continuation-in-part of application No. 11/584,271, filed on Oct. 20, 2006, now abandoned, which is a continuation-in-part of application No. 10/852,394, which is a continuation-in-part of application No. 10/603,963, which is a continuation-in-part of application No. 09/544,238, application No. 14/028,508, which is a continuation-in-part of application No. 14/013,018, which is a continuation-in-part of application No. 13/777,775, which is a continuation-in-part of application No. 13/247,964, which is a continuation-in-part of application No. 12/785,122, which is a continuation-in-part of application No. 12/778,228, which is a continuation-in-part of application No. 10/926,267, filed on Aug. 25, 2004, now abandoned, which is a continuation-in-part of application No. 09/514,940, filed on Feb. 28, 2000, now Pat. No. 7,058,601, application No. 14/028,508, which is a continuation-in-part of application No. 14/013,018, which is a continuation-in-part of application No. 13/777,775, which is a continuation-in-part of application No. 13/247,964, which is a continuation-in-part of application No. 12/785,122, which is a continuation-in-part of application No. 12/778,228, which is a continuation-in-part of application No. 12/764,934, filed on Apr. 21, 2010, now Pat. No. 8,676,667, which is a continuation-in-part of application No. 11/223,226, filed on Sep. 9, 2005, now abandoned, which is a continuation-in-part of application No. 10/135,493, filed on Apr. 30, 2002, now abandoned, application No. 14/028,508, which is a continuation-in-part of application No. 14/013,018, which is a continuation-in-part of application No. 13/777,775, application No. 14/028,508, which is a continuation-in-part of application No. 13/777,775, which is a continuation-in-part of application No. 13/247,964, which is a continuation-in-part of application No. 12/785,122, which is a continuation-in-part of application No. 12/778,228, which is a continuation-in-part of application No. 12/764,934, which is a continuation-in-part of application No. 11/085,678, filed on Mar. 21, 2005, now abandoned, which is a continuation-in-part of application No. 09/819,174, filed on Mar. 27, 2001, now abandoned.

(60) Provisional application No. 60/184,537, filed on Feb. 24, 2000, provisional application No. 60/289,033, filed on May 4, 2001, provisional application No. 60/193,160, filed on Mar. 28, 2000.

(56) References Cited

U.S. PATENT DOCUMENTS

| | | | |
|---|---|---|---|
| 6,069,310 | A | 5/2000 | James |
| 6,078,657 | A | 6/2000 | Alfieri et al. |
| 6,088,733 | A | 7/2000 | Kikuchi |
| 6,128,378 | A | 10/2000 | Diener et al. |
| 6,219,652 | B1 | 4/2001 | Carter et al. |
| 6,243,480 | B1 | 6/2001 | Zhao et al. |
| 6,256,627 | B1 | 7/2001 | Beattie et al. |
| 6,264,560 | B1 | 7/2001 | Goldberg et al. |
| 6,282,653 | B1 | 8/2001 | Berstis et al. |
| 6,330,672 | B1 | 12/2001 | Shur |
| 6,345,182 | B1 | 2/2002 | Fabritius et al. |
| 6,363,253 | B1 | 3/2002 | Valentine et al. |
| 6,408,282 | B1 | 6/2002 | Buist |
| 6,427,132 | B1 | 7/2002 | Bowman-Amuah |
| 6,442,169 | B1 | 8/2002 | Lewis |
| 6,445,785 | B1 | 9/2002 | Chan et al. |
| 6,463,275 | B1 | 10/2002 | Deakin |
| 6,490,345 | B2 | 12/2002 | Fleischer et al. |
| 6,508,709 | B1 | 1/2003 | Karmarkar |
| 6,510,419 | B1 | 1/2003 | Gatto |
| 6,529,592 | B1 | 3/2003 | Khan |
| 6,529,878 | B2 | 3/2003 | De Rafael et al. |
| 6,601,044 | B1 | 7/2003 | Wallman |
| 6,614,781 | B1 | 9/2003 | Elliott et al. |
| 6,629,890 | B2 | 10/2003 | Johnson |
| 6,661,884 | B2 | 12/2003 | Shaffer et al. |
| 6,915,268 | B2 | 7/2005 | Riggs et al. |
| 6,947,540 | B2 | 9/2005 | Madoch et al. |
| 7,006,988 | B2 | 2/2006 | Lin et al. |
| 7,059,515 | B2 | 6/2006 | White |
| 7,103,536 | B1 | 9/2006 | Kanno |
| 7,499,914 | B2 | 3/2009 | Diab et al. |
| 7,552,395 | B2 | 6/2009 | Neale et al. |
| 7,660,815 | B1 | 2/2010 | Scofield et al. |
| 7,725,465 | B2 | 5/2010 | Liao et al. |
| 7,756,850 | B2 | 7/2010 | Keith, Jr. |
| 8,452,765 | B2 * | 5/2013 | Hoffman et al. ............... 707/728 |
| 8,903,800 | B2 * | 12/2014 | Kakade et al. ................ 707/710 |
| 2002/0049622 | A1 | 4/2002 | Lettich et al. |
| 2002/0137217 | A1 | 9/2002 | Rowe |
| 2003/0018547 | A1 | 1/2003 | Steele |
| 2003/0050819 | A1 | 3/2003 | Koenigbauer et al. |
| 2004/0024739 | A1 | 2/2004 | Copperman et al. |
| 2005/0114324 | A1 | 5/2005 | Mayer |
| 2006/0242098 | A1 | 10/2006 | Wnek |
| 2007/0050393 | A1 | 3/2007 | Vogel et al. |
| 2008/0168033 | A1 | 7/2008 | Ott et al. |
| 2008/0195477 | A1 | 8/2008 | Kennedy et al. |
| 2009/0100125 | A1 | 4/2009 | McDowell |
| 2009/0282022 | A1 * | 11/2009 | Bennett ............................ 707/5 |
| 2010/0017267 | A1 | 1/2010 | Negron |
| 2011/0125743 | A1 | 5/2011 | Immonen et al. |
| 2011/0145088 | A1 | 6/2011 | Bonner et al. |
| 2011/0219295 | A1 * | 9/2011 | Adams et al. .................. 715/234 |

OTHER PUBLICATIONS

Hearst, et al. "Cat-a-Cone: An Interactive Interface for Specifying Searches and Viewing Retrieval Results using a Large Category Hierarchy", 1997.
Zamir, et al. "Grouper: A Dynamic Clustering Interface to Web Search Results", 1999.
Dumais, et al. "Hierarchical Classification of Web Content", 2000.
Wen, et al. "Clustering User Queries of a Search Engine", 2001.

(56) References Cited

OTHER PUBLICATIONS

Yue, et al., "A Video Summarization Tool Using Two-Level Redundancy Detection for Personal Video recorders", 2010.

Unknown, American Banker, "Chemical Buys Trading Software from Reuters", ( v 154, n 145, p. 14, Dialog file 9, Accession No. 00500233), 1994.

Croneliusson, Roy, SAP-R3, Jan. 1999. Downloaded from https:llqupea.ub.gu.se/dspace/bitstream/2077/1359/1/hattab.IA7400.pdf downloaded on Mar. 26, 2008, 47 pages.

SAP-CAPS, 1999. Downloaded from http://web.archive.org/web/19991105101002/www.caps.com/products/sap/sapr3.htm, 3 Pages.

RoutePro, 1999, Downloaded from http://web.archive.org/web/20010627035933/www.caps.com/products/rprodsgrfrpdsgrfeat.htm, 2 pages.

\* cited by examiner

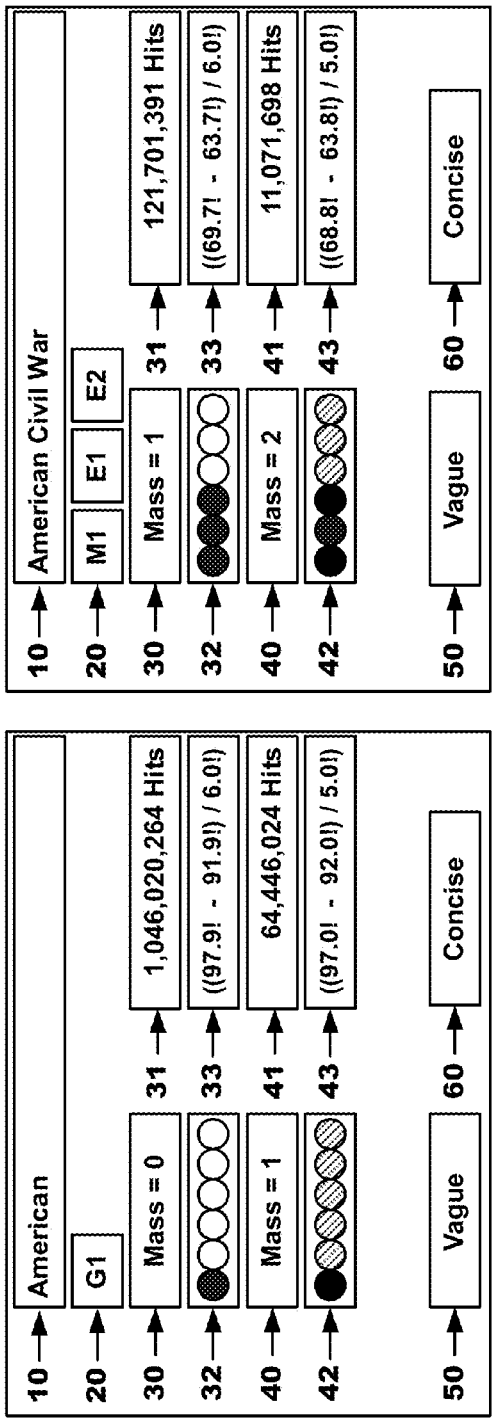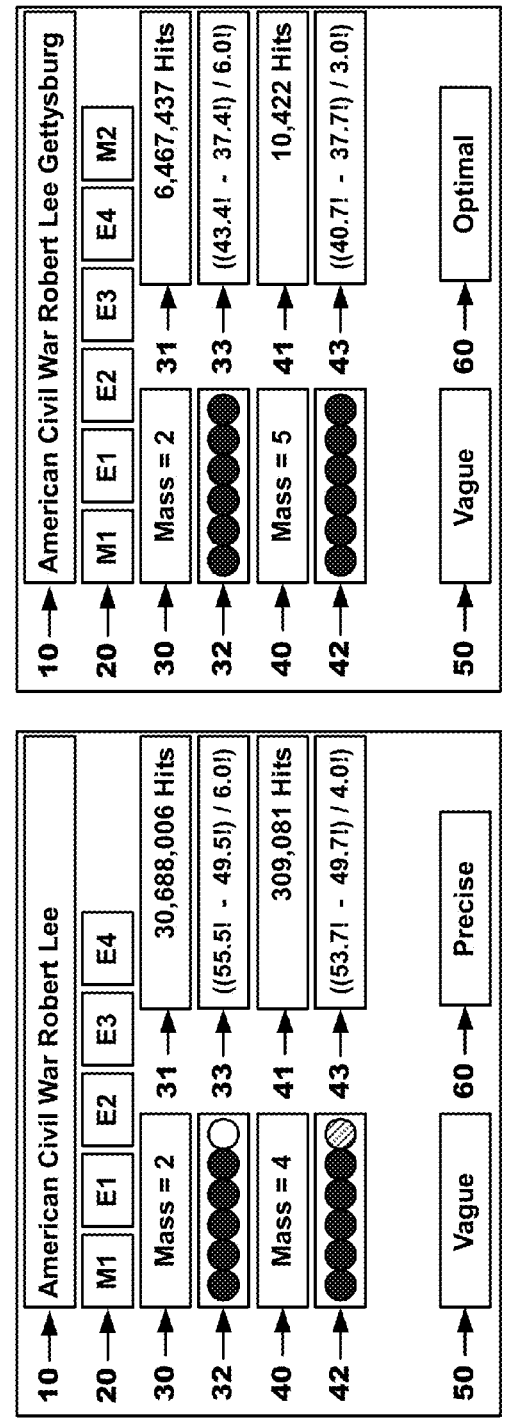

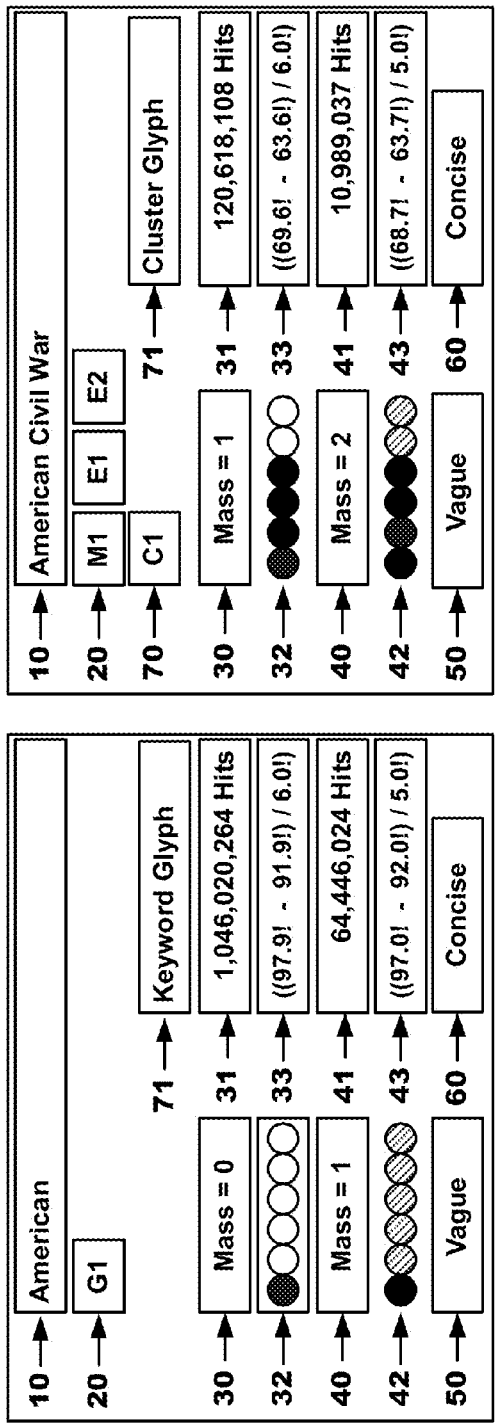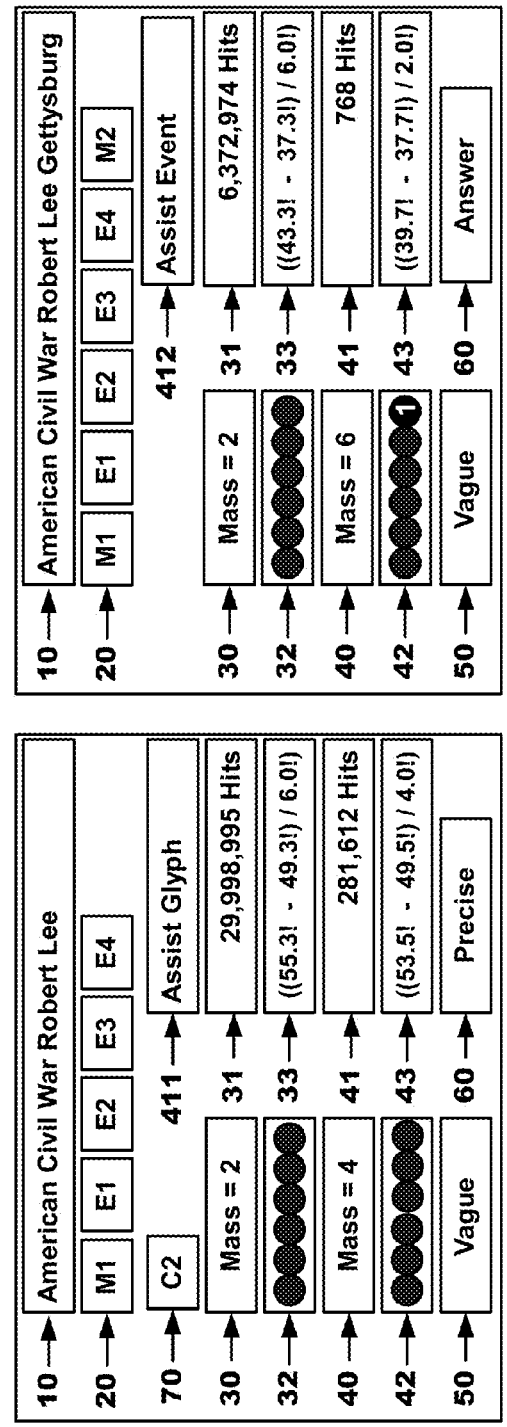

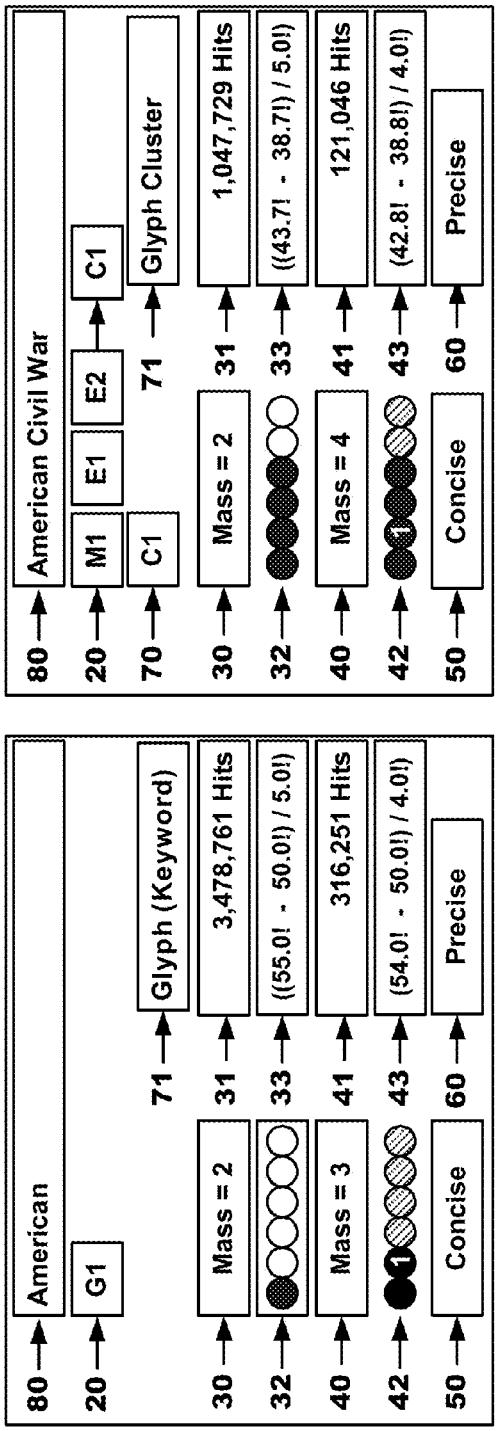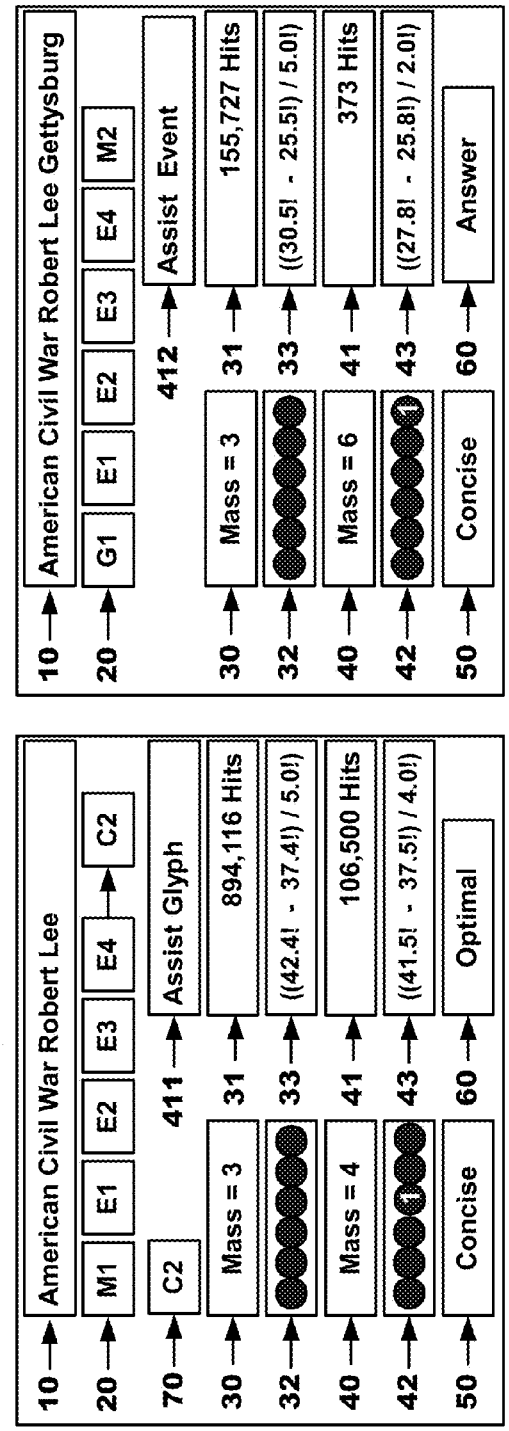

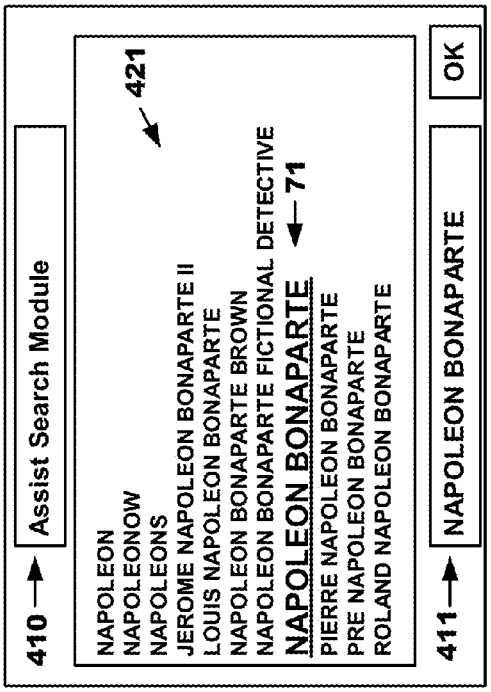
FIG. 10A
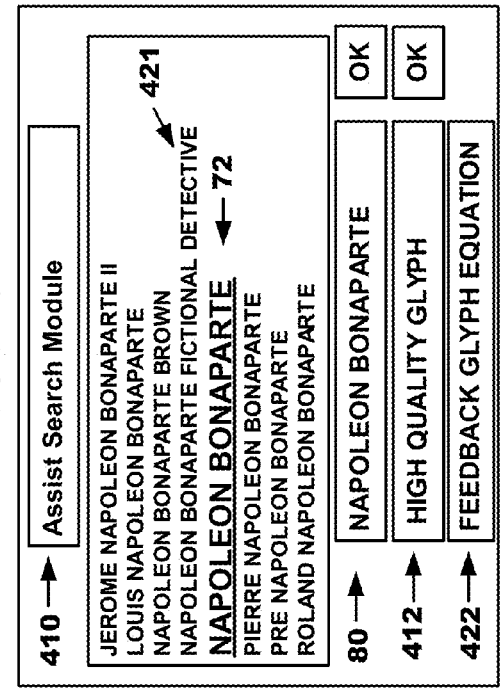
FIG. 10B
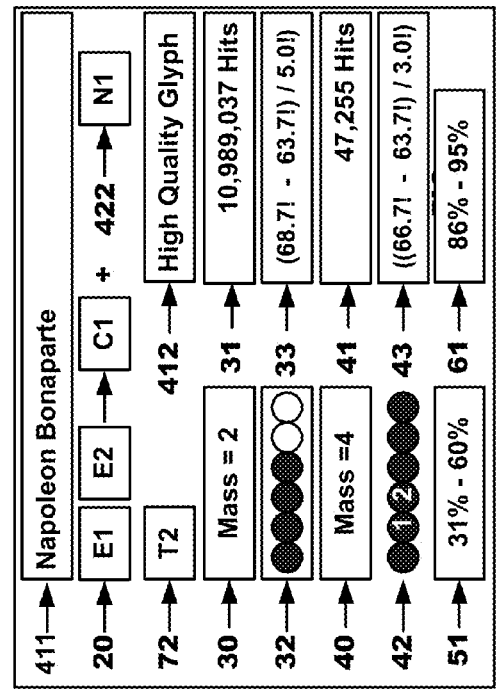
FIG. 10C
FIG. 10D

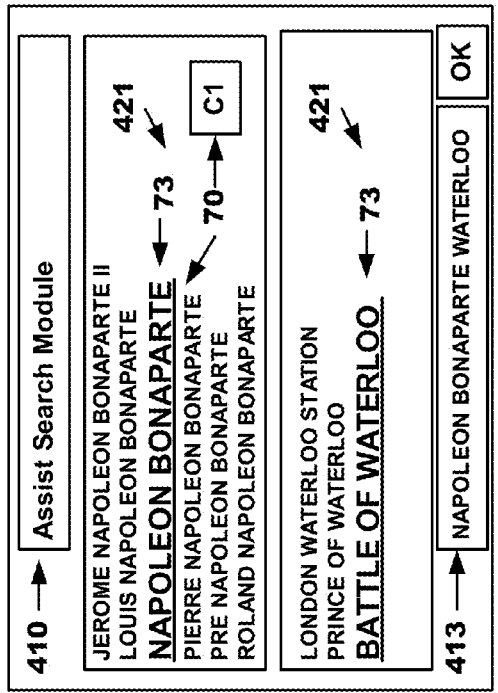
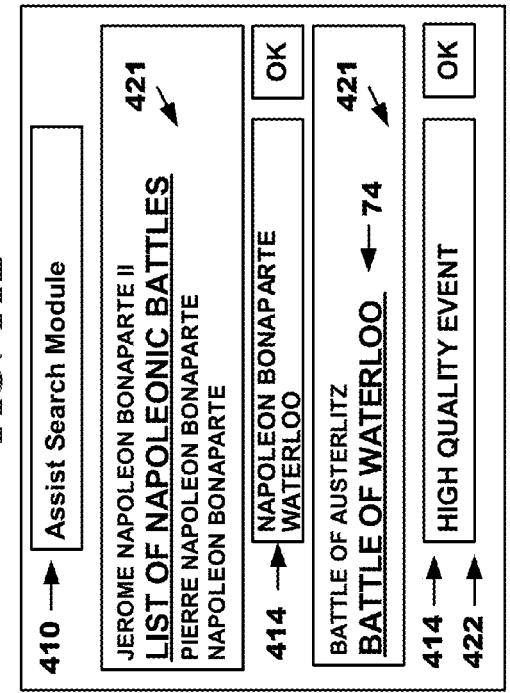
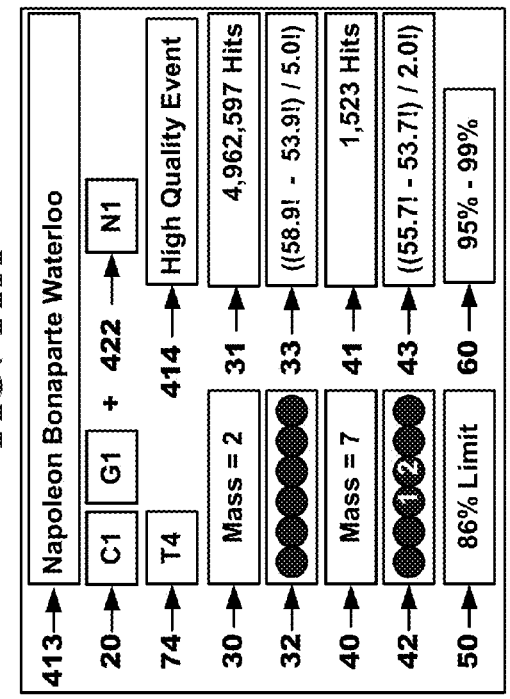
FIG. 11A  FIG. 11B  FIG. 11C  FIG. 11D

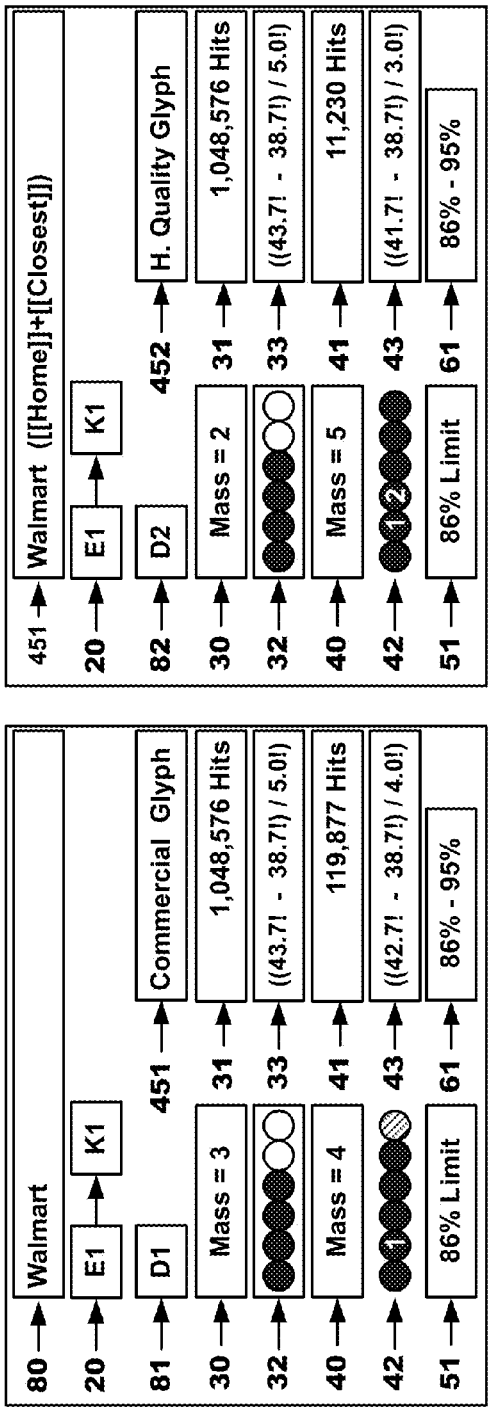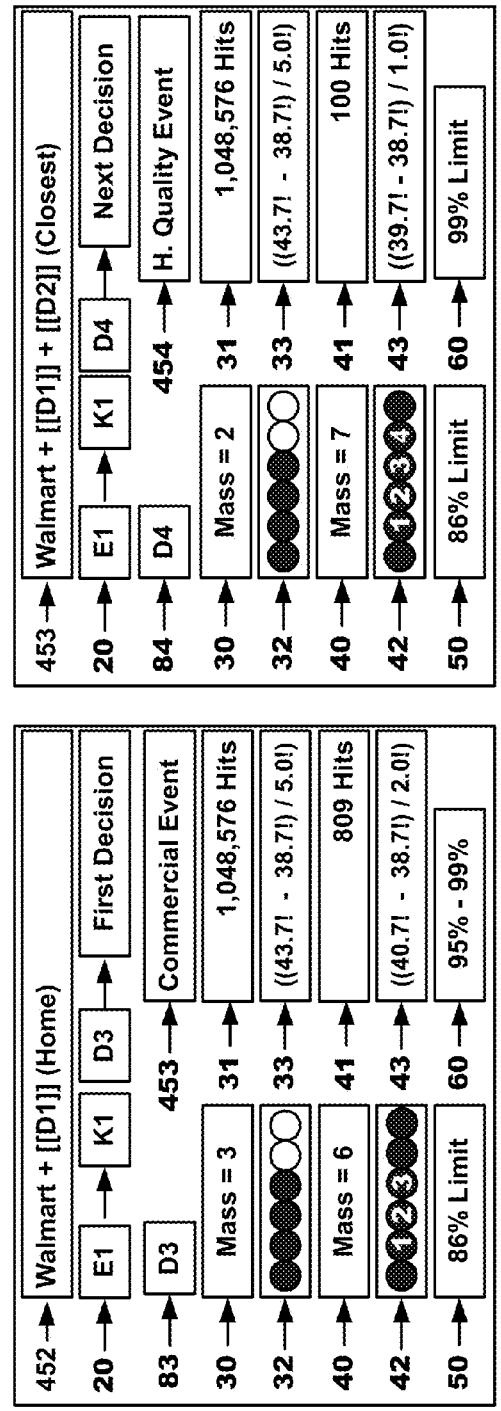
FIG. 12A  FIG. 12B  FIG. 12C  FIG. 12D

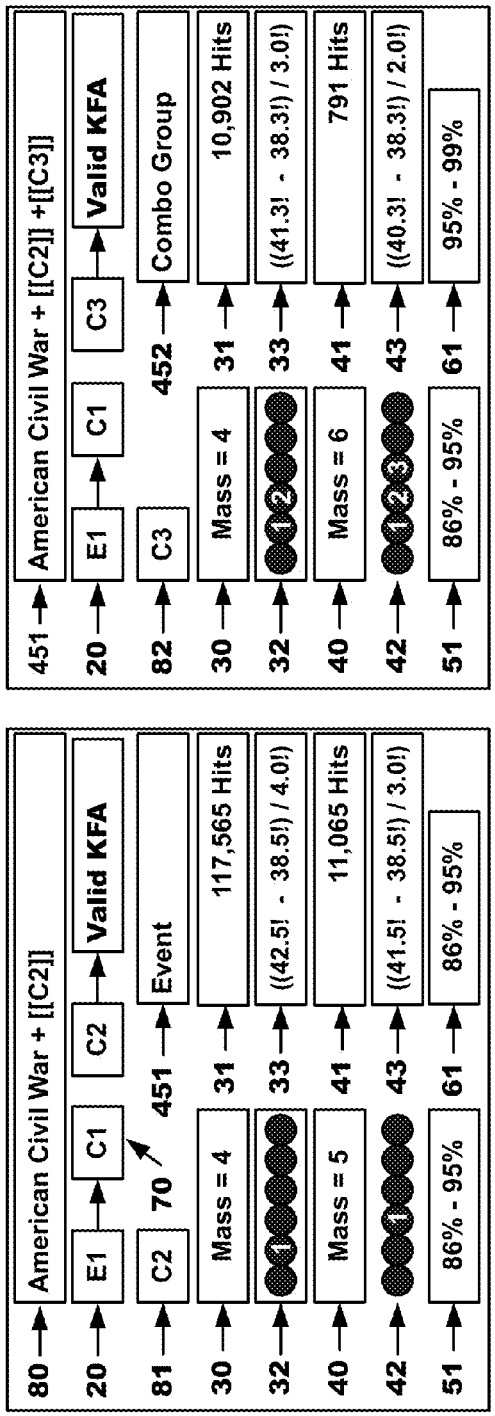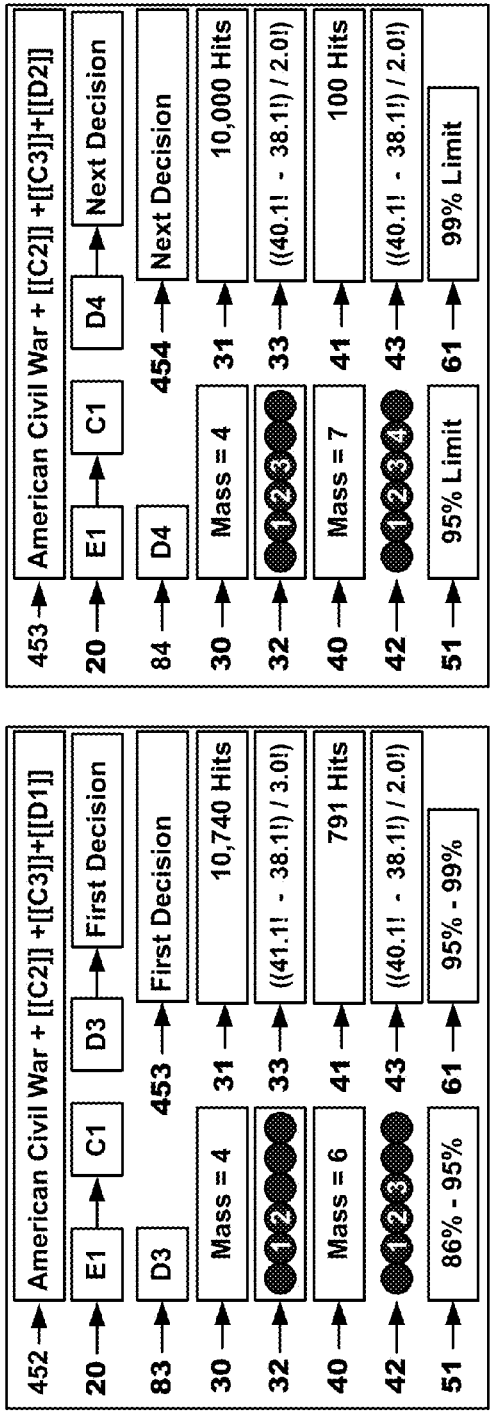
FIG. 13A  FIG. 13B  FIG. 13C  FIG. 13D

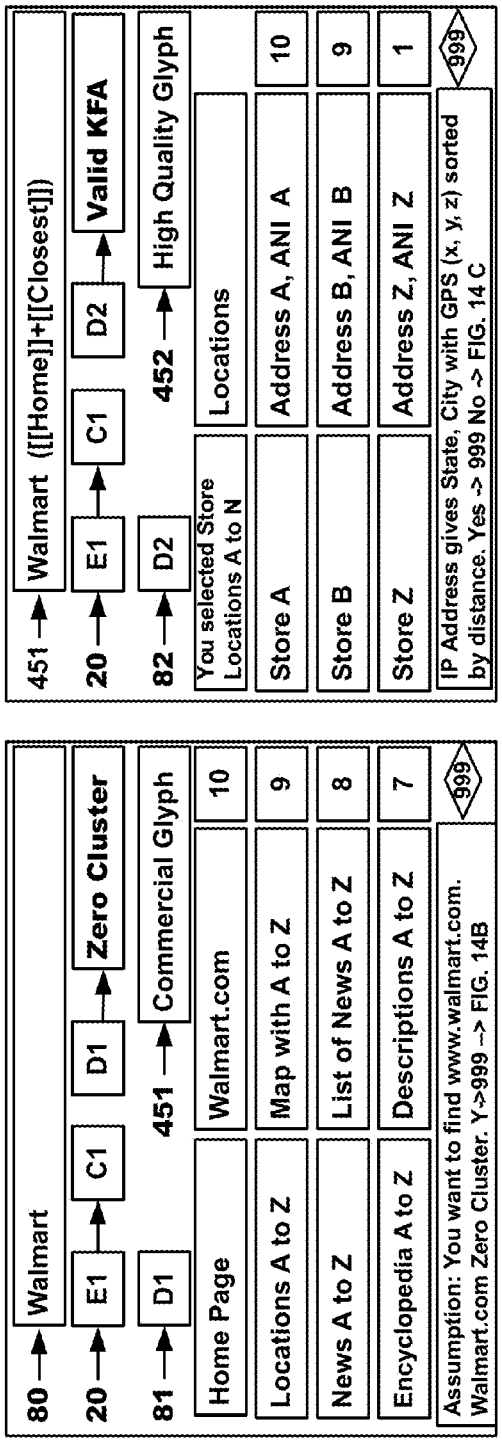
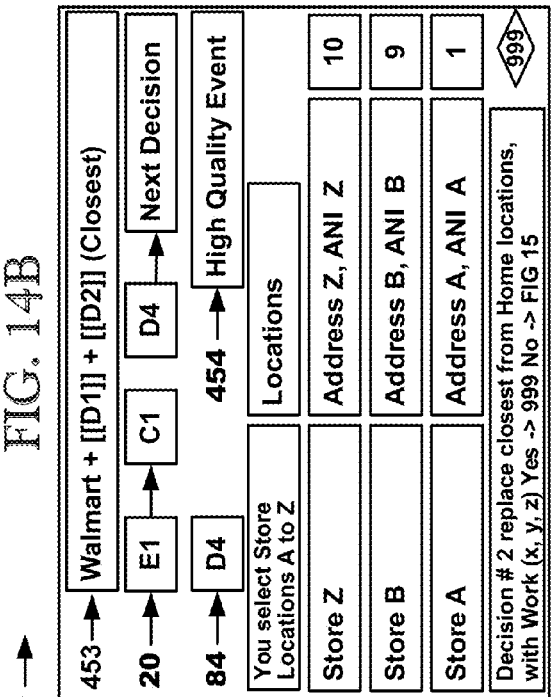
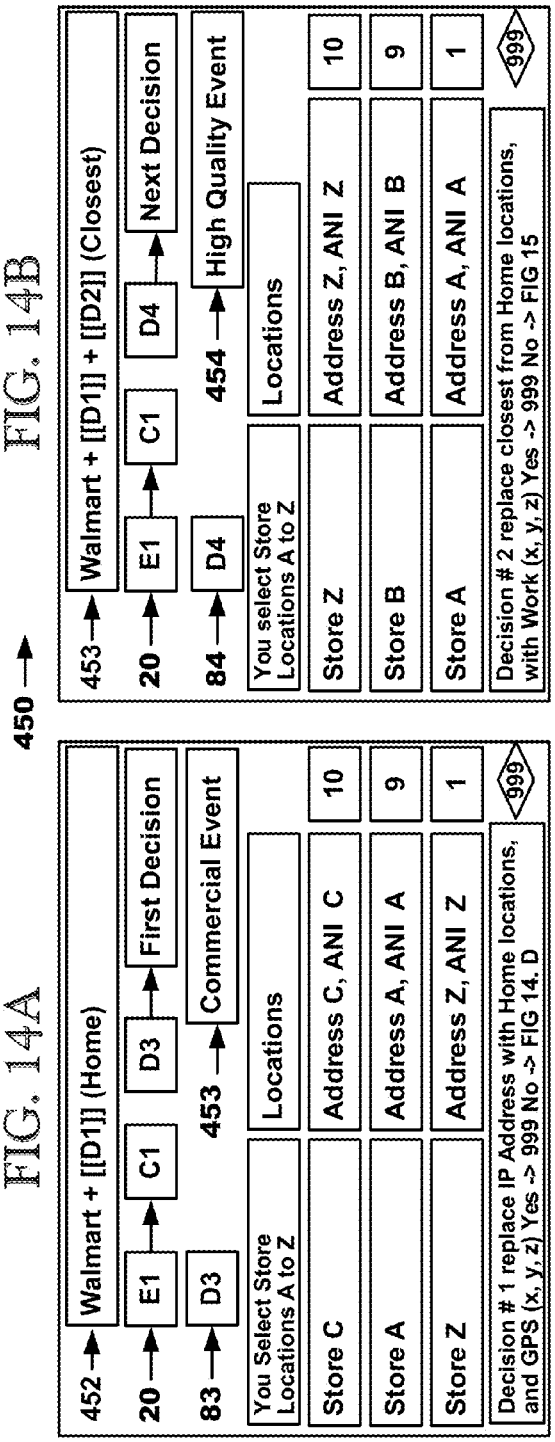

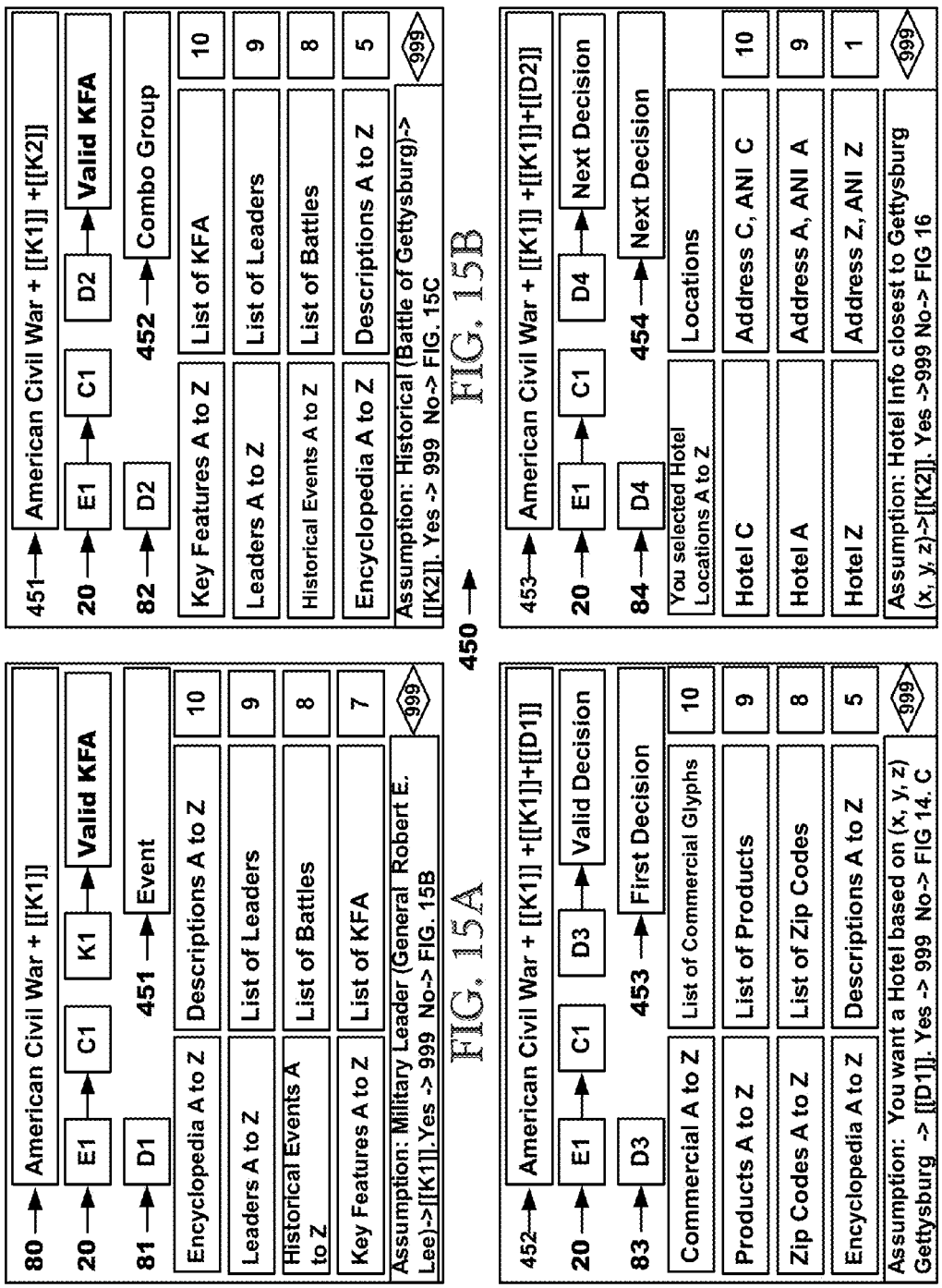

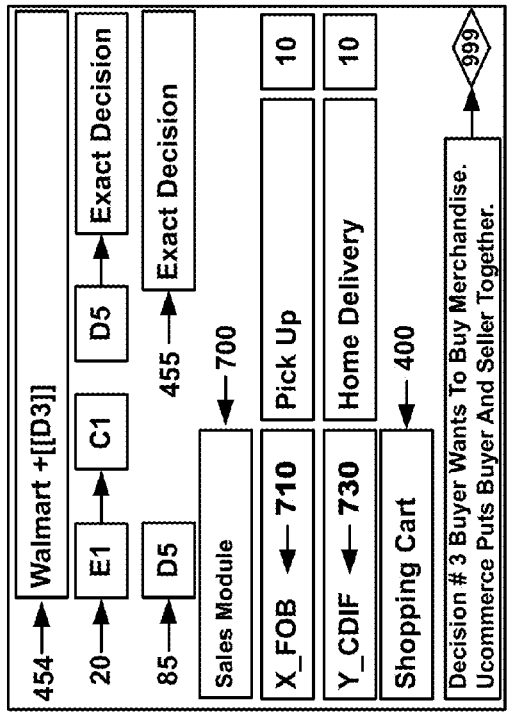
FIG. 16A
FIG. 16B
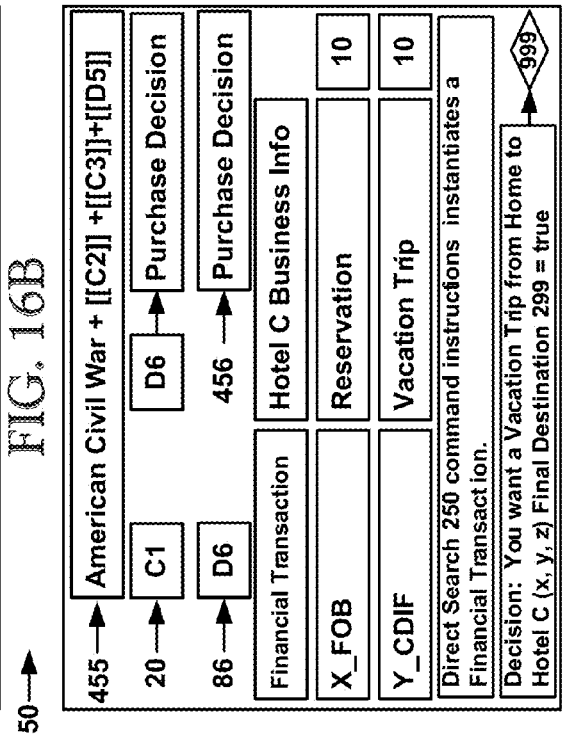
FIG. 16C
FIG. 16D

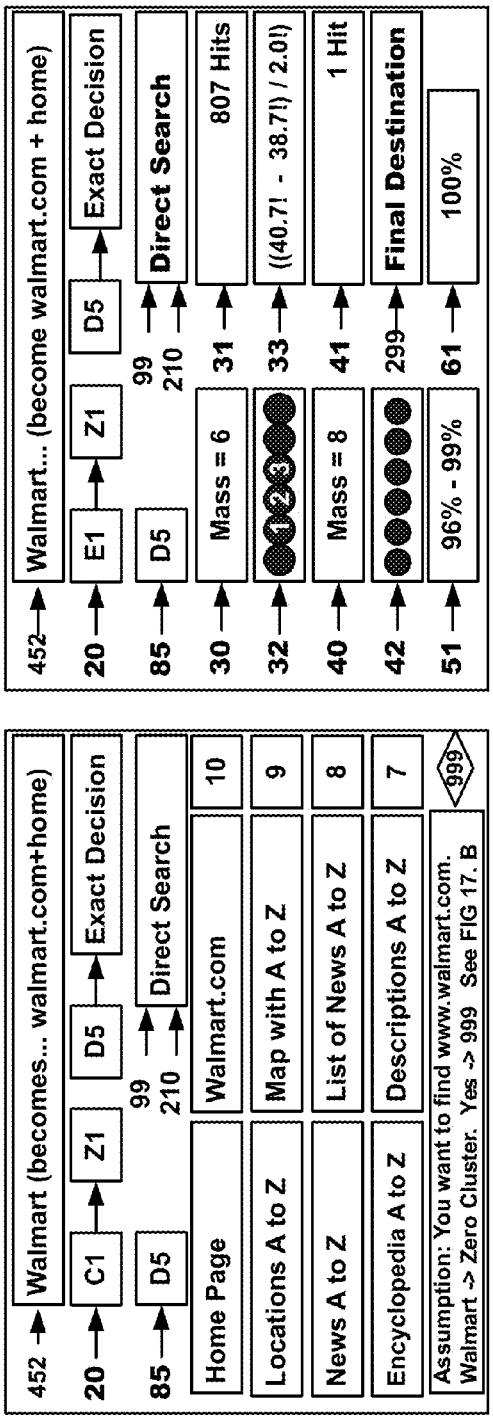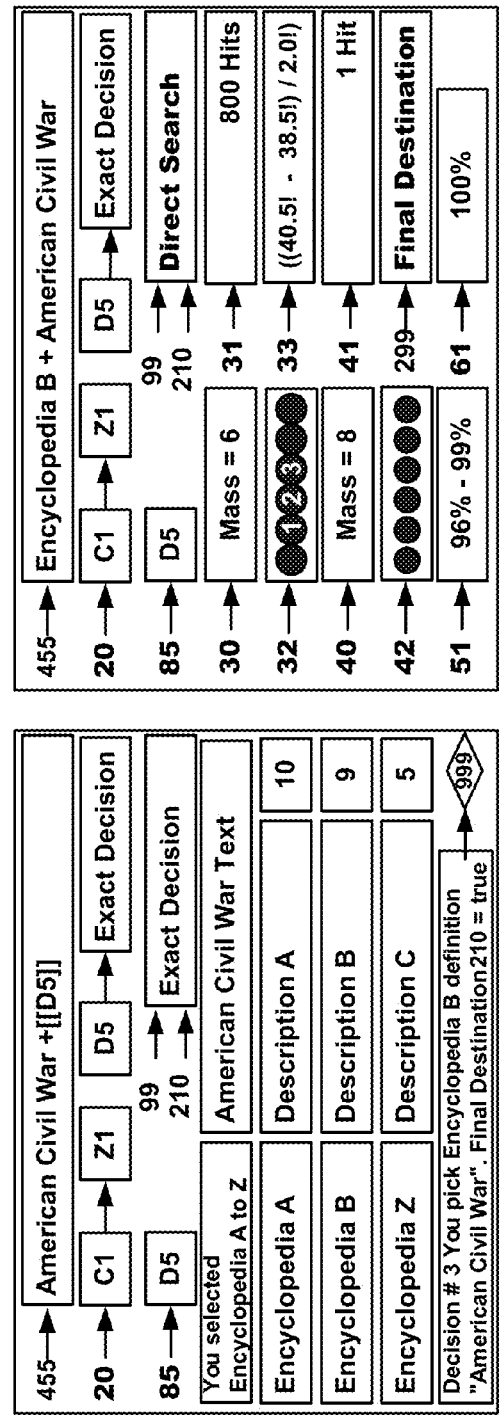

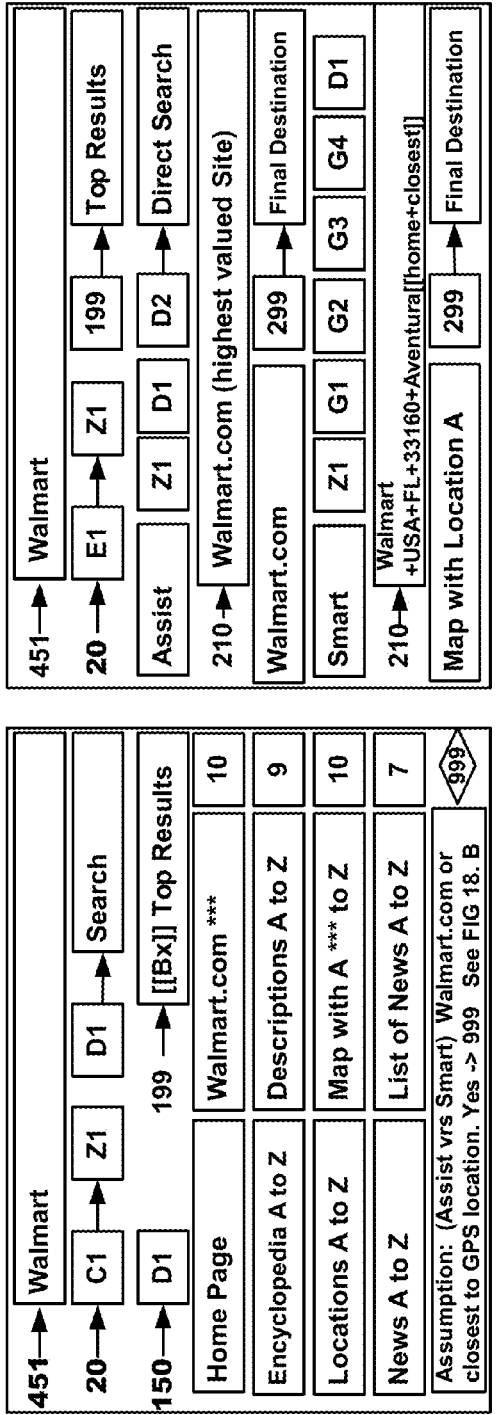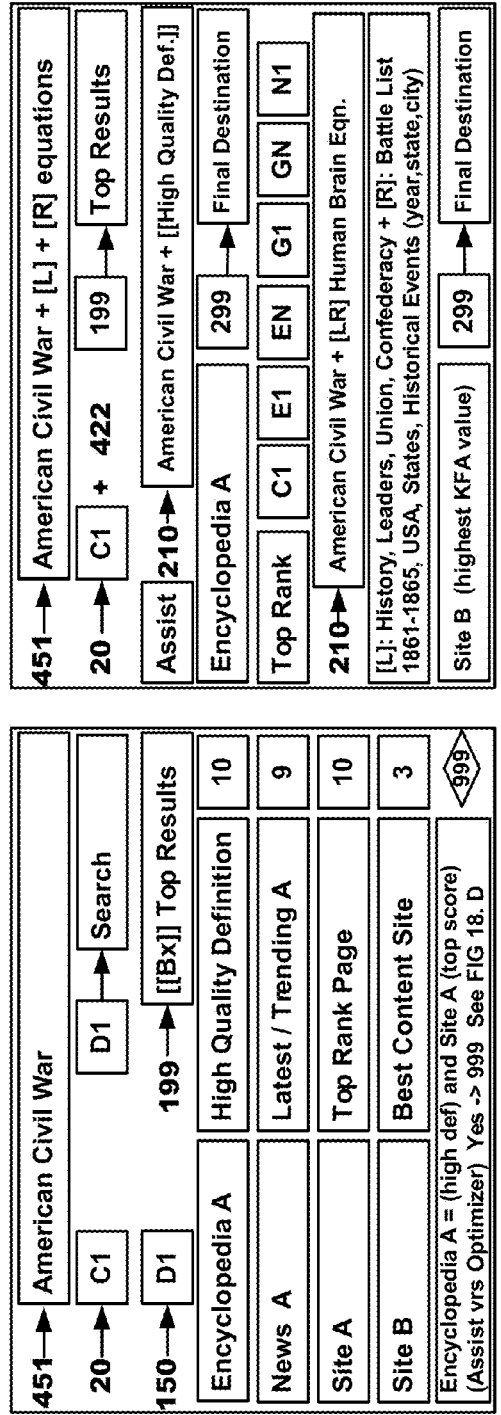
FIG. 18A
FIG. 18B
FIG. 18C
FIG. 18D

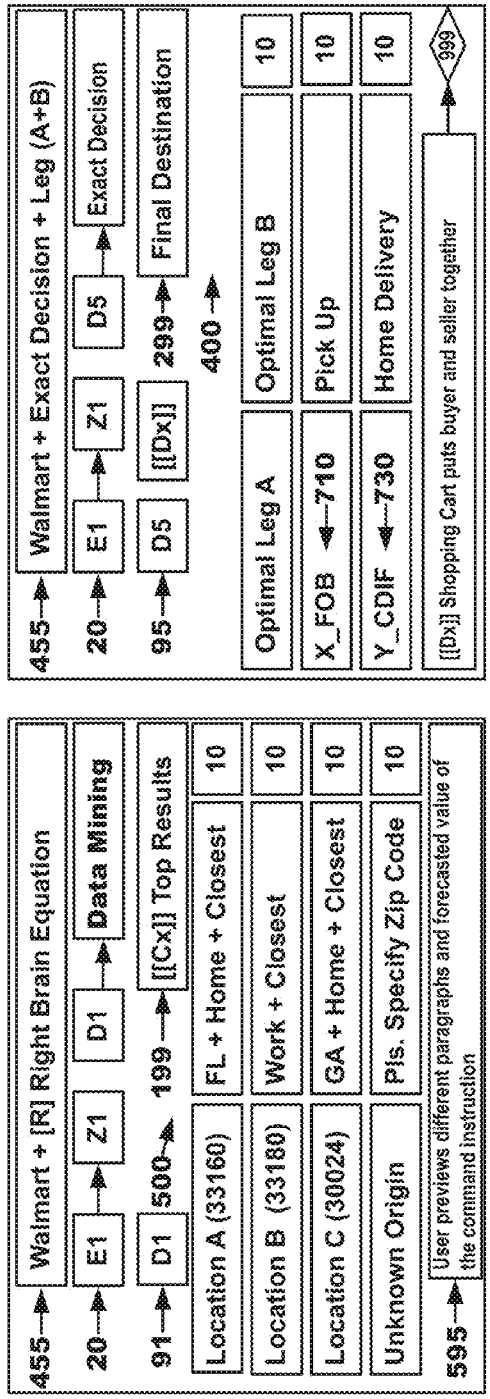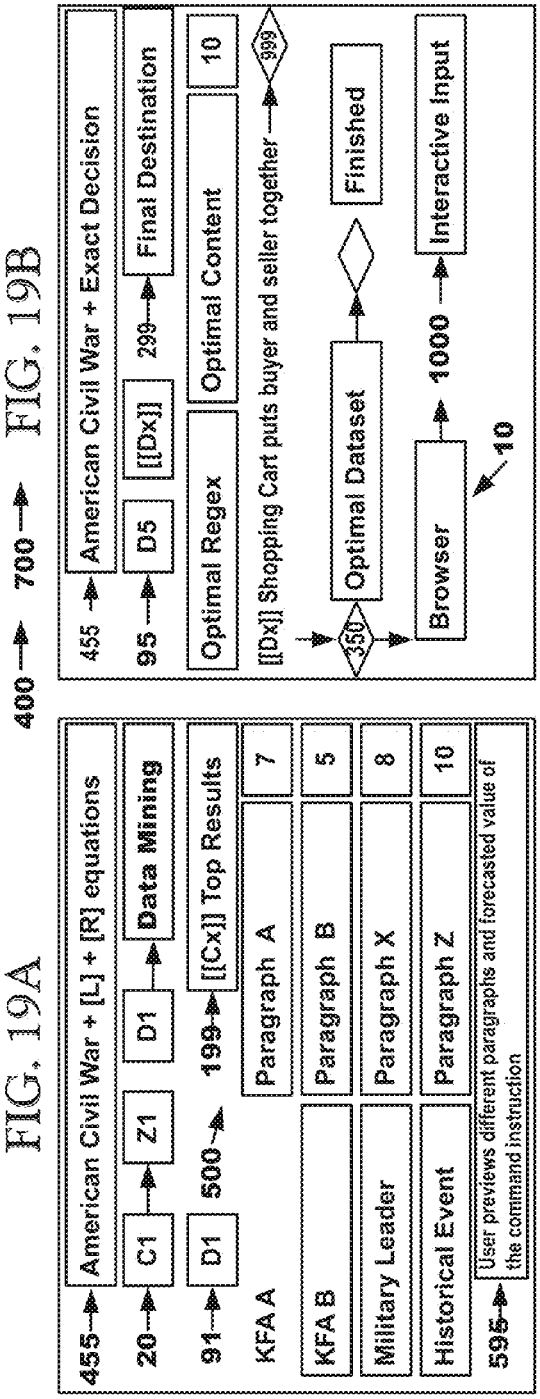
FIG. 19A  FIG. 19B  FIG. 19C  FIG. 19D

PERSONAL SEARCH RESULTS

CROSS REFERENCE TO RELATED APPLICATIONS

This Continuation-In-Part Utility Application claims the benefit of co-pending U.S. Continuation-In-Part patent application Ser. No. 14/013,018 filed on Aug. 28, 2013, which claims the benefit of co-pending U.S. Continuation-In-Part patent application Ser. No. 13/777,775 filed on Feb. 26, 2013, which claims the benefit of co-pending U.S. Continuation-In-Part patent application Ser. No. 13/247,964 filed on Sep. 28, 2011, which claims the benefit of co-pending U.S. Continuation-In-Part patent application Ser. No. 12/785,122, filed on May 21, 2010 (issued as U.S. Pat. No. 8,386,456 on Feb. 26, 2013), which claims the benefit of the following applications:

a. co-pending U.S. Continuation-In-Part patent application Ser. No. 12/146,420, filed on Jun. 25, 2008 (issued as U.S. Pat. No. 7,908,263 on Mar. 15, 2011);

b. co-pending U.S. Continuation-In-Part patent application Ser. No. 12/778,228, filed on May 12, 2010 (issued as U.S. Pat. No. 8,239,229 on Aug. 7, 2012), which claims priority to co-pending U.S. Continuation-In-Part patent application Ser. No. 12/764,934, filed on Apr. 21, 2010, which claims the benefit of co-pending U.S. Continuation-In-Part patent application Ser. No. 11/584,941, filed on Oct. 23, 2006, (issued as U.S. Pat. No. 7,809,659 on Oct. 5, 2010), which claims the benefit of Co-pending U.S. Non-Provisional patent application Ser. No. 10/852,394, filed May 24, 2004, (now abandoned), which claims priority to U.S. Provisional Application Ser. No. 60/184,537 filed on Feb. 24, 2000;

c. co-pending U.S. Continuation-In-Part patent application Ser. No. 12/778,228, filed on May 12, 2010 (issued as U.S. Pat. No. 8,239,229 on Aug. 7, 2012), which claims benefit of co-pending U.S. Continuation-In-Part patent application Ser. No. 10/926,267, filed on Aug. 25, 2004 (now abandoned), which claims the benefit of U.S. Continuation-In-Part patent application Ser. No. 10/603,963, filed on Jun. 25, 2003 (issued as U.S. Pat. No. 6,842,511 on Jan. 11, 2005), which claims the benefit of U.S. Non-Provisional patent application Ser. No. 09/544,238, filed on Apr. 7, 2000 (issued as U.S. Pat. No. 6,614,893 on Sep. 2, 2003), which claims the benefit of U.S. Provisional Application Ser. No. 60/184,537 filed on Feb. 24, 2000;

d. co-pending U.S. Continuation-In-Part patent application Ser. No. 12/778,228, filed on May 12, 2010 (issued as U.S. Pat. No. 8,239,229 on Aug. 7, 2012), which claims the benefit of co-pending U.S. Non-Provisional patent application Ser. No. 10/926,446, filed on Aug. 25, 2004 (issued as U.S. Pat. No. 7,050,813 on May 23, 2006);

e. co-pending U.S. Continuation-In-Part patent application Ser. No. 12/778,228, filed on May 12, 2010 (issued as U.S. Pat. No. 8,239,229 on Aug. 7, 2012), which claims the benefit of co-pending U.S. Non-Provisional patent application Ser. No. 09/514,940, filed on Feb. 28, 2000 (issued as U.S. Pat. No. 7,058,601 on Jun. 6, 2006), f. co-pending Continuation-In-Part Non-Provisional patent application Ser. No. 11/223,226, filed on Sep. 9, 2005 (now abandoned), which claims priority to U.S. Non-Provisional patent application Ser. No. 10/135,493, filed on Apr. 30, 2002 (now abandoned), which claims priority to U.S. Provisional Application Ser. No. 60/289,033 filed on May 4, 2001;

g. co-pending U.S. Continuation-In-Part patent application Ser. No. 11/584,271 filed on Oct. 20, 2006 (now abandoned), which claims priority to U.S. Continuation-In-Part Non-Provisional patent application Ser. No. 10/852,394, (now abandoned) which claims the benefit of Continuation-In-Part patent application Ser. No. 10/603,963, filed on Jun. 25, 2003, (issued as U.S. Pat. No. 6,842,511 on Jan. 11, 2005), which claims the benefit of U.S. Non-Provisional patent application Ser. No. 09/544,238 (issued as U.S. Pat. No. 6,614,893 on Sep. 2, 2003), filed on Apr. 7, 2000, which claims priority to U.S. Provisional Application Ser. No. 60/184,537 filed on Feb. 24, 2000; and h. co-pending U.S. Continuation-In-Part Non-Provisional patent application Ser. No. 11/085,678 filed on Mar. 21, 2005 (now abandoned), which claims the benefit of co-pending U.S. Non-Provisional patent application Ser. No. 09/819,174, filed on Mar. 27, 2001 (now abandoned), which claims priority to U.S. Provisional Application Ser. No. 60/193,160 filed on Mar. 28, 2000;

i. all of which are incorporated herein in their entireties.

FIELD OF THE INVENTION

The present invention relates generally to an Internet search engine optimizer method and system, hereinafter referred as optimizer. More particularly, the present invention relates to an interface product that works independently and in parallel with a browser client and search engine supercomputer server architecture that gathers, analyzes, and distills interactive input. The optimizer analyses input and transforms the input into a personalized search pattern. For each search pattern the optimizer continuously maintains and updates pre calculated and preprocessed array or collection of best-fit web page responses.

BACKGROUND OF THE INVENTION

The limitations, drawbacks and/or disadvantages of technologies are as follows: search engines are based on Boolean algebra eigenvector algorithms that are used to parse and filter information indices until the top page ranks are determined and displayed to the end user. Unfortunately, some specific keywords combinations may be too narrow and confound a search by hiding optimal results. search engines are predominately configured to perform static search patterns. Each search is processed from the ground up without taking into account many requests belonging to one reply. A session consists of consecutive related and unrelated search requests to reach the final destination.

The Internet searchable environment or (U) can be construed as a complex network with billions of web pages. The search engine supercomputer analyzes each web page, and then uses eigenvectors to determine the highest ranked pages from the end user's match criteria. As explained, in related subject matters "As the size of the environment increases the level of redundancy and tax burden of a system exponentially increases".

Transform Data: The supercomputer system cleans, standardizes and organizes the spaghetti of the environment by organizing the information into managerial hierarchical structured supercomputer (hereinafter referred as HIVE) that removes redundancy, latency and the tax burden.

Synchronize tasks: the HIVE is a decentralized supercomputer consisting of a plurality of nodes, which are specifically arranged in three tiers. The summit tier coordinates and executes global tasks. The middle tier coordinates and executes regional tasks. The lower tier coordinates and executes localized tasks and processes the lion share of non-critical transactions. The summit node of each tier synchronizes tasks by sending command instructions messages that assigns the fuzzy logic state of each node belonging to its chain of command.

Lateral and Vertical Synergy: A tier consisting of groups of nodes that are independent from other groups of nodes. Each tier partition performs mission critical tasks within their domain and works in parallel with other partitions of the same tier. Each node can shunt available resources using lateral and vertical synergy with parent, sibling or subordinate nodes to maximize available resources. Each node continuously analyzes its own environment current conditions and forward chains summary information until reaching the summit. At this point, the summit nodes rearward chain messages with command instructions that priorities resources, and notify each subordinate with command instructions tasks constraints based on network conditions to avoid saturation, clog and eliminate the tax burden of the environment'.

Remove chaos and anarchy: Once the 'spaghetti of the environment' is eliminated the HIVE creates command messages that are also known as summary reports that coordinate and synchronize each node to operate at maximal output capacity. Each node operates without adversely affecting the network flow of data. The HIVE maximizes available throughput and limits the exponential rate of growth of complexity as the size of the environment increases.

Convert requests into Ideas: Search engines dependency on Boolean algebra use inductive reasoning popularity scores to find the top results. In contrast, the HIVE using deductive reasoning to interpret interactive input as being part of an idea being formulated by both the left and the right sides of the brain. When a request is incomplete the HIVE probabilistically supplies and inserts missing gaps of information. Related art teaches that a Vector CDR can be expressed as the summation of a plurality of valid vectors. The HIVE correlates a plurality of partial vectors and creates a resultant vector containing the top (n) pages.

Heartbeat: The Summit tier gives a heartbeat to the HIVE.

The X_FOB and Y_CDIF Inventory Control Bitmaps are referred as summary report objects, with pre-calculated look up information to eliminate redundant and resource intensive calculations.

Brief Summary of Applicant's Related Applications

Search engines use Boolean algebra and eigenvector algorithms to parse and filter information indices until the top page ranks are determined and displayed as output. Unfortunately, some specific keywords combinations may be too narrow and confound a search by hiding optimal results. Search engines are predominately configured to perform single static search patterns. Each search is processed from the ground up, analyzing the searchable environment, without taking into account many requests belonging to one session. A session consists of consecutive related and unrelated search requests while randomly surfing the web.

The optimizer in parallel keeps in existence for each search pattern its corresponding improved environment that contains all relevant bound pages. Each improved environment possesses a relative master index. The optimizer continuously purifies and synchronizes the plurality of relative master index that permits to match/merge and then correlate the Internet's master index in real time.

The optimizer continuously scans and detects the Internet searchable environment for new content with significant difference quality to update each search pattern's improved environment relative master index and top (n) pages as output.

The optimizer dynamically gains factors and attenuates the content of each page based on the end user's usage pattern of behavior. Existing master index have an absolute rank value for each page.

The optimizer rank value is dynamically adjusted by matching independent variables and related keywords belonging to the search pattern to generate a content value. The optimizer "cherry picks" the best content value web pages as output. The output is forward chained back to the end user's terminal and displayed.

The optimizer is a method and system for simulating Internet browser search capacities that cleans, standardizes, organizes, and transforms the massive amount of data into a lingua franca comprising of valid keywords, term clusters, and unique geospatial patterns contained in the Internet collectively known as patterns that exist in page. The comprehensive collection of search patterns with their relative master index are stored and continuously updated as web crawlers detect significant changes in the environment.

Each search pattern consists of at least one independent variable, e.g. (I), (J), (K), (X), (Y) and (Z). Search patterns with 0 independent variables use randomly surfing the web techniques that find the final destination within the massive (U) or Internet environment.

Related Applications (U.S. patent application Ser. No. 10/926,446/Issued U.S. Pat. No. 7,050,813)

Partial Differential Equation Vectors Model: Solves solutions with two or more independent variable. The solution requires an equation with a plurality of independent variables. Thus we replace the traditional vector with Partial Differential Equation Vectors.

For example, using set theory, the telecommunications environment U can be divided into three independent networks: Fixed (X), IP Telephony (Y) and Wireless (Z). A Simple Call exists when the call uses a single network (X, Y or Z), whereas a complex Call exists when the call must use more than one independent network environment to complete the call.

For example, a call uses three different networks Fixed, IP Telephony and Wireless (I, J, K), each independent variable solves the billing entity and resultant vector for the call. The Switch controlling the call uses its Partial A and Partial B functions to create a final resultant vector that includes all the circuits belonging (I, J, K) for just one call. Yes, they are three independent billable calls. One per network, yet in fact there is only one call.

Related Applications: (U.S. patent application Ser. No. 10/852,394

Computer Network System: consists of a plurality of nodes, where each one is programmed with Artificial Intelligence to perform predefined tasks that are logistical rationalized based on the current conditions of the environment. The computer network system is synonymous with Superset (U). The cluster is divided into three geospatial tiers: a) Global, b) Regional, and c) Local. Each tier has multiple functionalities such as a) Provisioning, b) Total Quality Management or (TQM), c) Data Manipulation, d) Management Information Systems (or MIS), e) Expert Information Systems (or EIS) and f) Inventory Control.

Computer Network System Nodes: All nodes are autonomous and in real time analyze, evaluate, gather and process information from the environment. From incipiency upon receiving the fuzzy logic piece of information that triggers a new task or update pending activities. Each node is assigned to Superset (I), Set (I, J), or Subset (I, J, K) cluster tier, and to the geospatial domains (X) or global, (Y) or regional, and (Z)

local to map independent variables (I, J, K, X, Y, Z) that build the managerial hierarchy as follows:

Managerial Hierarchy: The summit tier allows users to have access to their information in real time. The middleware tier geographical manages physical warehouses. The lower tier controls a plurality of points of presence belonging to $3^{rd}$ parties and collectively constitutes the workhorse of the system.

Node Synchronization and Buffer Resources: Every predefined cycle each node synchronizes the latest inventory. Nodes request siblings for any excess buffer resources to complete a task using vertical and lateral synergy. Parent nodes use their chain of command to coordinate their subordinates. Thus, all nodes synergistically collaborate to process tasks and collectively mimic a global online supplier.

Eliminates the Spaghetti Phenomena: The global online supplier gathers, distills, analyzes and then standardizes raw information into primed lingua franca data so that information certainty is achieved and thus removes the chaos and anarchy or spaghetti phenomena.

Primes Vector CDR: Lingua franca messages are vectors and contain the vector trajectory and all transactional segments information. Legacy systems send all transactional segments to centralized billing data warehouses that match/merge each transactional component and then correlate the information into a billing entity. Whereas the computer network uses artificial intelligence to assign a hierarchical owner and plots circuit by circuit the vector trajectory and only activates relevant nodes to the transaction so that nodes can communicate amongst themselves via forward and reward chaining. Nodes send all dynamic and fixed costs to hierarchical owner so it can correlate the billing entity absent of a centralized billing system.

Avoids Taxing the Throughput: The computer network system monitors in real time the limited resources and capacities of the network to avoid taxing available throughput. Each node can update resources as soon as new relevant messages from the environment are detected.

Uses Synergy to Maximize Throughput: Upon receiving environment command instructions each node can manage the flow of information of their subordinates from predefined point A to point B routes to avoid saturation. The computer network maximizes throughput by permitting each node via synergy to shares resources with other nodes that have substantial buffer resources to eliminate the tax burden and waste.

Analyzes Network Traffic: Network traffic is analyzed as the informational traffic is measured based on the latest command instructions and known routing throughput limitations of each given domain. The summit nodes of each tier perform the nonobvious task synchronizing and managing their subordinates to use synergy to minimizing waste before permitting data to be transmitted through their chain of command.

Computer Network System Reaches Informational Certainty: Nodes remove waste at incipiency one transaction at a time, so that the computer network system can be considered a real time invention.

Computer Network System Stabilizes the Flow of Information: Summit and Middleware nodes stabilize the flow of information and update the XLDB database with trending statistics used to optimize resources and available bandwidth. Each node of the managerial hierarchical synergy works in parallel with others nodes to work as a single unit permitting the computer network to create a virtual instance of the organizational environment.

Computer Network System is a Real Time System: Once the 'spaghetti phenomena' is eliminated, informational certainty is achieved removing the need for a central mainframe. Consequently, a real time solution consists of synergistically synchronizing all the computer network system functions.

Computer Network System Evaluates Network Resources: Each node has its own location identification means and must be assigned to one geospatial specific domain cluster such as local, regional or global. Each activity and task is processed in parallel, starting from the point of origin and ending at the point of destination. The computer network system rearward chains the routing vector information through the simulation network to the point of origin and analyzes and evaluates the best usage of network resources.

Related Applications (U.S. patent application Ser. No. 11/584,941/Issued U.S. Pat. No. 7,809,659)

XCommerce, Deductive reasoning Supercomputer: Is a method that simulates the entire superset of potential valid interactive input regular expression requests construed during an Internet browser search and converting the results set into a vector based statistical data that enable efficient and accurate searching. XCommerce simulates, standardizes and partitions the Internet into a plurality of concurrently working environment using a managerial hierarchical method of indexing and searching as follows:

Managerial Hierarchical Index Relationships: A request is broken down into keywords and clusters, and then converts them into a search pattern that optimally minimizes the quantity of relevant pages.

Determining what is Relevant and Irrelevant: Pages that match a relationship index are relevant, and those that do not are irrelevant. Irrelevant web pages are discarded completely from analysis.

Partition the Environment into Blocks: The environment is subdivided into a plurality of blocks that are arranged based on managerial hierarchical levels as follows:

Each search pattern restricts the geometric rate of growth of the Internet searchable environment by creating the relevant environment that is used by all managerial relationship levels when purifying the search process.

The Internet searchable environment is considered a Super Block and is partitioned into a three level managerial hierarchy. First: the primary index relationship creates blocks that maps an improved environment. Second: the secondary index relationship creates sub blocks that maps an optimal environment. Third: the tertiary index relationship creates mini Blocks that maps an optimal solution.

Identifies Static Search Patterns: The computer network system determines if the search pattern already exist and if yes obtains the top (n) pages from the databases and sends the output to the end user.

Calculates Dynamic Search Patterns: Uses managerial hierarchical relationship indices to create optimal size partitions and compares remaining key featured associations to determine if they match against the content of the top (n) pages. When a match occurs each page is gain factored by each key featured association vector value and then the optimizer picks the top (n) pages with the highest values.

Finds New Search Patterns: Stores each new search patterns and top (n) pages.

Displays Top (n) pages: Sends and displays the output to the end user's terminal.

Related Applications (U.S. patent application Ser. No. 12/146,420/Issued U.S. Pat. No. 7,908,263)

A search engine optimizer, hereinafter referred as Cholti, gathers interactive input from a browser. The optimizer reorganizes the interactive input as optimal input that is sent to the search engine, and then the output is sent to the end user. Each request is converted into a search pattern and stored as a mathematical equation that mimics the left (linguistics) and right (geospatial) side of the brain.

Related Applications (U.S. patent application Ser. No. 12/785,122/Issued U.S. Pat. No. 8,386,456)

Lottery Mathematics: Cholti and XCommerce teaches how to improve accuracy of a requests by using independent variables (I, J or K) to map and create managerial hierarchical partitions of the Internet environment such as: from top to bottom Superset (I), Set (I, J) and Subset (I, J, K) datasets. For this application Lottery Mathematics is hereinafter referred to as Logic Mathematics.

Hot and Cold Analysis: Uses logic mathematics to estimate the size of the environment as the end user types interactive input and assigns primary independent variable (I) to the filter with the following formula: $(x!-(x-6)!)/6!$ For example: the number of permutations for a 10 number draw is $(10!-4!)/6!4!=24$, $6!=720$ and $10!=3,628,800$. $(3,628,800/24)/720=210$ permutations. Thus, each grid has 1/210 in being the outcome. The English language estimated master index size of the environment in the year 2013 is Logic_305_Basis or 1,099,511,627,776 or $(2^{40})$ pages hereinafter for simplicity 1 trillion.

For example: The number of permutations for a 305 number draw is 1 trillion or $305!-(305-6)!/6!$ The quality of the Glyph that represents (I) or primary index relationship determines the Mass. For example, If the keyword Civil=(I) the Mass=1, and if cluster "American Civil War"=(I) the Mass=2.

a. Mass=0 (Logic_305_Basis=1 trillion) or $305!-(305-6)!/6!$
b. Mass=1 (Logic_100_Basis=1,192,052,400) or $100!-(100-6)!/6!$
c. Mass=2 (Logic_70_Basis=131,115,985) or $70!-(70-6)!/6!$
d. Mass=3 (Logic_50_Basis=15,890,700) or $50!-(50-6)!/6!$
e. Mass=4 (Logic_40_Basis=3,838,380) or $40!-(40-6)!/6!$
f. Mass=5 (Logic_30_Basis=593,775) or $30!-(30-6)!/6!$
g. Mass=6 (Logic_20_Basis=38,760) or $20!-(20-6)!/6!$
h. Mass=7 (Logic_15_Basis=5,005) or $10!-(10-6)!/6!$
i. Mass=8 (Logic_6_Basis=1) or final destination.

Table 1: Size of Environment Based on Mass

I. Simulating the Human Brain:

Human Brain: Each linguistic Glyph is assigned to the left side [L] of the brain and each geospatial Glyph is assigned to the right side [R] of the brain and the Anchor is the best common denominator Glyph.

The dominant tendency of each request is given a left side brain [L] linguistic, and right side brain [R] geospatial tendency, and then Cholti reorganizes, maps and plots the glyphs to create a managerial hierarchical relationship index.

Human Brain Intelligence: transforms each search pattern and identifies independent variables based on mass partitions of the Internet and creates Join, Simple, Hybrid, complex and optimal Pyramids.

Human Brain Wisdom: Analyzes the top (n) pages and expands each [AX], [BX] and [CX] Glyph equation with key featured association dependent variables.

Cholti picks one of four search strategies: [LL], [LR], [RL], and [RR], which have different set of business rules to analyze the Internet and limits partitions not to exceed 1 billion or $(2^{30})$ pages and thus eliminates the principal confounding variable, which is the exponential rate of growth of the environment.

For example, the environment grows geometrically to 20 billion, or 40 billion or 100 billion or 1 trillion pages, but once the dominant tendency is selected the relevant environment will always be a Logic_100_Basis or 1,192,052,400 pages, while making most pages irrelevant.

II. [L+R] Managerial Relationship Events

If the independent variable (I) is represented by the Historical Event "American Civil War"{1863}, where "American Civil War" is the left side of the brain variable (I) and 1863 is the right side of the brain (X), and are merged to a single event or superset (I!) with Mass=3. The double event or set (I, J)!! with mass=5 and independent variables (I, J, X, Y), and finally for triple event or Subset (I, J, K)!!! with Mass=8 consisting of left side of the brain [L] independent variables (I, J, K) and right side of the brain [R] independent variables (X, Y, Z).

First Significant Event or (FSE): is a vague search that maps an improved environment, where the Internet searchable environment (a, b, c, d, e, f) becomes (FSE, b, c, d, e, f) with superset (I) dataset. IV is the abbreviation for independent variables.

a. Mass=1 (Logic_100_IV_1 or 75,287,520) or $100!-(100-5)!/5!$
b. Mass=2 (Logic_70_IV_1 or 12,103,014) or $70!-(70-5)!/5!$
c. Mass=3 (Logic_50_IV_1 or 2,118,760) or $50!-(50-5)!/5!$ Table 2: FSE Size of Environment Based on Mass Second Significant Event or (SSE) is a concise search that maps an optimal environment, where the Internet search environment (a, b, c, d, e, f) becomes (FSE, SSE, c, d, e, f) with Set (I, J) dataset.

a. Mass=1 (Logic_100_IV_2 or 3,921,225) or $100!-(100-4)!/4!$
b. Mass=2 (Logic_70_IV_2 or 916,895) or $70!-(70-4)!/4!$
c. Mass=3 (Logic_50_IV_2 or 230,300) or $50!-(50-4)!/4!$
d. Mass=4 (Logic_40_IV_2 or 91,390) or $40!-(40-4)!/4!$
e. Mass=5 (Logic_30_IV_2 or 27,405) or $30!-(30-4)!/4!$ Table 3: SSE Size of Environment Based on Mass Third Significant Event or (TSE) is a precise search that maps an optimal solution, where the Internet environment (a, b, c, d, e, f) becomes (FSE, SSE, TSE, d, e, f) with Subset (I, J, K) dataset.

a. Mass=1 (Logic_100_IV_3 or 161,700) or $100!-(100-3)!/3!$
b. Mass=2 (Logic_70_IV_3 or 54,740) or $70!-(70-3)!/3!$
c. Mass=3 (Logic_50_IV_3 or 19,600) or $50!-(50-3)!/3!$
d. Mass=4 (Logic_40_IV_3 or 9,880) or $40!-(40-3)!/3!$
e. Mass=5 (Logic_30_IV_3 or 4,060) or $30!-(30-3)!/3!$
f. Mass=6 (Logic_20_IV_3 or 1,140) or $20!-(20-3)!/3!$
g. Mass=7 (Logic_15_IV_3 or 445) or $10!-(10-3)!/3!$ Table 4: TSE Size of Environment Based on Mass Fourth Significant Event or (QSE) is a search that maps the optimal answer. The Internet environment (a, b, c, d, e, f) becomes optimal answer (FSE, SSE, TSE, QSE, e, f).

a. Mass=1 (Logic_100_IV_4 or 4,950) or $100!-(100-2)!/2!$
b. Mass=2 (Logic_70_IV_4 or 2,415) or $70!-(70-2)!/2!$
c. Mass=3 (Logic_50_IV_4 or 1,225) or $50!-(50-2)!/2!$
d. Mass=4 (Logic_40_IV_4 or 780) or $40!-(40-2)!/2!$
e. Mass=5 (Logic_30_IV_4 or 435) or $30!-(30-2)!/2!$ f. Mass=6 (Logic_20_IV_4 or 190) or 20!−(20−2)!/2!
g. Mass=7 (Logic_15_IV_4 or 45) or 10!−(10−2)!/2!

Table 5: QSE Size of Environment Based on Mass

Gamma Functions

Cholti and XCommerce teach how to create search patterns that improve the accuracy of a request. The likely and unlikely analysis uses Gamma functions to solve for the size of the environment.

For example, the end user types 1863 American Civil War, and the optimizer maps using left side of the brain [L] term cluster "American Civil War" and with right side of the brain [R] 1863 to create "American Civil War" {1863}. The "War between the States" is also synonymous with the American Civil War, and thus "between the" which are dependent variables since they have a Mass less than 1. The dominant tendency and the keyword "States" which has a Mass of 1+ is likely. The keywords {1861, 1862, 1864 and 1865) are Unlikely. The likely and unlikely Gamma function values are as follows: "American Civil War" {1863}=50!−(50−5)!/5! or 2,118,760 pages. Plus "States" likely analysis: = 49.9!−(49.9−5)!/5! or 2,096,762 pages. Plus unlikely analysis: =49.86!−(49.86−5)!/5! or 2,088,014 pages.

Search Pattern Variables

Independent Variables: The IV Numbers are the control variables or independent variables that determine the Circle of Accuracy, which in turn limit the size of the environment.

Dependent Variables: The Dependent Variables (hereinafter DV) Numbers are the observable variables or dependent variables, and are considered strong filters.

Complement Variables: The Complement Variables (hereinafter CV) Numbers are the measured variables or dependent variables, and are considered weak filters.

a. Independent/Control Variables (IV Numbers)+1.00
b. Dependent/Observable Variables (DV Numbers)+0.100
c. Dependent/Complement Variables (CV Numbers)+0.010

Table 6: Gamma Function Adjustment of the Logic Basis

Partial Differential Equations: When using partial differential equations usually the solution is not unique due to the fluid and dynamic conditions of the search process, and ergo input combination usage behavior directly affects the size of the environment (or boundary of the region) where the solution is defined.

Related Applications (U.S. patent application Ser. No. 11/085,678)

The Valorized Optimal Advertisement 2013 maximizes customer satisfaction and measures accuracy and media value to the corporate sponsor as follows:

Rule #1 GPS Location: Obtains GPS coordinates from smart devices or approximates Area Code, and Zip Code based on IP Address or end user preferences.

Rule #2 Credits: May be purchased, obtained from viewing advertisements or purchasing products, or consensual sharing information with corporate sponsors.

Rule #3 Commercial Glyph: Identifies usage patterns and then match between corporation and individual based on a profile that uses demographics and purchase patterns.

Rule #4 Anonymous: The individual information is kept anonymous.

Rule #5 Consensual: By means of command instruction decisions the individual grants permission of what exact information is disclosed in return for financial compensation.

Rule #6 End User Profile: Shopping cart correlates purchasing, trending and usage patterns with actual advertisement command instruction decision and demographics.

Rule #7: Links: Based on the End User's Profile and the commercial glyph the shopping cart offers targeted links that yield sponsored web pages;

Rule #8: ANI: Based on the End User's Profile and the commercial glyph the shopping cart offers targeted Automatic Number Identification (ANI) that instantiates a call between End User and Sponsor;

Rule #9: Safety: For each financial transaction the shopping cart obtains GPS location, device specific information, and when required a photograph and password.

Rule #10: Territories and Laws: Limit what advertisements are available.

Rule #11: summary report: The shopping cart uses the managerial hierarchical relationship index to obtain the human brain equation that contains the probabilistic weight of each valid Glyph to gain factor or attenuate advertisements decisions.

Related Applications (U.S. patent application Ser. No. 13/247,964)

Simulation Comparison

'Boolean Algebra: End user types the input "Napoleon" or (I) and the inductive reasoning search engine assigns a "1" when a match occurs, and sums up the number of unique occurrences which is equal to 8,000,000 pages. Like always there is good, bad and ugly content. Based, on the business model of the search engine companies the lion share of their profit comes from advertisement, we will assign as (J) the commercialization process, which shrinks the environment to 10,000 pages, and the further distill by using the page quality value to create an environment of 100 pages. At this point, selecting the top (n) result is really easy, by just automatically selecting the pages with the highest page rank and then sends the output to the end user's browser. In this case, the top site will always be wikipedia.com since Ask.com and Powerset technologies made a great emphasis of the content quality value of this site and then search engine industry followed. Encyclopedia Britannica is (2) and Encarta is (3) have a 10 in quality value and have a very high page rank.

Cholti: determines that "Napoleon" is the anchor and commercial keyword and using the human brain strategy creates an [LL] environment of 8,000,000 pages that possess Super Site (a, b, c) characteristics, which is used to create the Simple Pyramid and [AX] macro page that converts "Napoleon" into "Napoleon Bonaparte" and adds "France", "General" and "Emperor" to the Advanced Glyph equation with magnitude of 7. At this point Cholti uses super site (d) actual content characteristics, to create the hybrid pyramid and [BX] macro page that adds "Austerlitz", "Waterloo", "Blucher" and "Wellington", and "1801 to 1815" to the improved Glyph equation with magnitude of 10. Cholti now uses super site (e) trending characteristics, to create the complex and [CX] macro page that adds a collection of key featured associations to the optimal Glyph equation with magnitude of 15. Now Cholti performs the 'cherry picking' process to select the top (n) pages by reading, deciphering, analyzing the actual content.

The Real Difference: Wikipedia.com will always be the optimal web page for the static and vague search, whereas Cholti has three paths (a) (static ranking) for concise searches Wikipedia.com is automatically the optimal response, (b) (actual content) for precise searches if the end user typed additional keywords, and Cholti determines that Encyclopedia Britannica is the best fit content, then Wikipedia.com is demoted from the automatic $1^{st}$ position and sent to the $2^{nd}$ position. (c) (TQM levels of satisfaction) for optimal searches where wikipedia.com had the top spot, but did not satisfy, and after the 2$^{nd}$ request Encyclopedia Britannica had the top spot, and also did not satisfy, for the 3$^{rd}$ request the top responses for the request (1-2) are demoted, and now Encarta Encyclopedia the other high quality content has the top spot.

Cholti is dynamic and personalized whereas existing search engines are static. TQM is the heart and soul of the technology and thus customer satisfaction. Yes, accuracy is directly related to the time from beginning to end, and the amount of knowledge and work required from the end user to reach the final destination, Cholti previews the entire content in behalf of the human to minimize time and using deductive reasoning reduces the amount of gray matter required to reach the final destination to maximize satisfaction.

The present inventions overcomes these "issues" or greatly improved the search optimally by doing the following: Generally stated end user's requests are converted into the Mayan style glyphs that have left side and right side of the brain characteristics. The system understands that each request on its own can be optimally satisfying, and also knows that some require trial and error method. To solve this dilemma the optimizer creates super glyphs that have weighted value for a plurality of instances within a session.

Cholti Method 2013

Build the Summary Report Objects

A. Simulate entire superset of potential valid interactive input regular expression construed during an Internet browser search and then organizing and distributing the searchable environment using at least one index relationship and then hierarchically creating a chain of command comprising of super blocks, blocks, sub blocks, mini blocks and elements. Index refining each position to create a partial master index that maps an improved environment and then assigning a unique value from highest to lowest to each site and web page.

Create the Search Patterns

B. Assigning to each unit (or position) of the chain of command a search pattern.

C. Storing each valid search pattern into the 'CORE List' database.

D. Setting a vector value to search pattern based on estimated environment size and the partitioning the interactive input into keywords and clusters that are transformed into glyphs. Then assigning a vector value to each Glyph depending if they are independent, dependent or complement variables. Independent variables are synonymous with index relationships.

Create the Improved Environments

E. Each position of the chain of command is a partition of the Internet searchable environment and can be referenced from the 'CORE List' using index relationships. The index relationships of each search pattern are used to create an improved environment.

F. Assigning a unique value lowest to highest each site and web page belonging to each position of the chain of command or unit object.

Likelihood Analysis

G. The simulation measures inductively each position using the Likelihood Analysis applying associative and transitive relationships to synthesize linguistic and geospatial information key featured associations. The key featured associations and transitives are dependent and complement variables that are used to gain factor the vector value of each page.

Relevancy Analysis

H. The simulation measures deductively each position using the relevancy analysis applying associative and transitive relationships to identify confounding variables. Assigning to each unit object a feedback equation that attenuates content with confounding variables in order to stabilize and reduces sensitivity parameter variations due to the environment.

Store the Information of Each Position (or Unit Object)

I. The simulation assigns a unique value lowest to highest each site and web page, a gains factor value for each Glyph belonging to key featured association and feedback equation, and stores the latest top (n) results or summary report in the 'CORE LIST' database.

Interactive Input

A. Identify each keyword and cluster interactively belonging to the input and immediately convert input into index relationships.

B. Query the 'CORE LIST' to map the most probable position (or unit object).

C. Display to end user the estimated environment size of the input and the improved environment size using the most probable position.

Static Output: Determine if the most probable position contains the final destination and if yes then Display to the end user the summary report object. The output is readily available and preprocessed no further calculations are required.

Dynamic Output: obtains the key featured association and transitives and feedback equation of the most probable position (or unit object) and correlate the results. The assign a vector value to each page, using the hot algorithm that applies the resultant key featured association equation to gain factor each page and the cold algorithm resultant feedback equation that attenuates the vector value of each page.

D. Display to end user the top (n) results with the highest vector value.

Assisted Input

A. Identify each keyword interactively and offer assisted input command instruction to the end user. Each assisted input maps the index relationship belonging to a unit object.

B. Obtain decision from end user and the selected unit object from 'CORE List'

C. Display to end user the estimated environment size of the assisted input and the improved environment size of the unit object (or position).

D. Display to the end user static output.

Smart Input

A. Obtain the right side of the brain check mate combination GPS coordinates and identify the commercial Glyph of the interactive input. Then transform the commercial Glyph and GPS coordinates into smart input and derive the index relationship that maps a unit object.

B. Query the 'CORE LIST' to map the most probable unit objects.

C. Display to end user the estimated environment size of the smart input and the improved environment size of the unit object.

D. Determine if a valid Static output exist . . . . If yes the output is readily available and no further calculations are required. If no create the dynamic output and display Personal Input A. Identify interactive, assisted and smart input and convert input into an index relationship that maps a unit object (or position).

B. Query the 'CORE LIST' to map the most probable position.

C. Offer a Personal Input list of command instruction to the end user. Each element of the list is obtained by performing the hot/cold analysis of the most probable position.

D. Obtain Personal input decisions from end user.

E. Interactively display to end user the estimated environment size of the personalized input and the improved environment of the unit object (or position).

F. Once the confounding variables are eliminated from the search process Display to the end user the final destination and no further calculations are required.

Improved Environment (Simplification)

Once input maps a search pattern with at least one index relationship the environment is considered to be improved. The primary index relationship based on dominant tendency is the anchor that picks a relevant environment that was built using a reverse chain of command algorithm to map between 1 or 2 billion pages. For example, an animal would include vertebrate or invertebrate, mammals or birds.

For example, when Tiger is selected at least one relevant environment is available, first is Animal relevant environment, another is the Military relevant environment, and finally the Sports relevant environment. Animal is [LL], Military is [LR], and Sports [RR] search patterns. Why do you ask? Well [LL] is Tiger that is an animal, whereas [LR] is a tank that was used in WWII (1939-1945), whereas [RL] Detroit Tigers is a commercial Glyph or smart input that contains a right brain checkmate. Nevertheless, each unit objects of Tiger yield an improved environment, since each valid unit object is considered its own environment. Each improved environment has a partial master index that maps each page and site with a value.

Optimal Solution

Once the input of a search pattern yield the final destination, the human brain has a left side and right side checkmate combination that yields an optimal element or a single page where n=1. Thus, the top (n) results belonging to any position of the entire valid superset of keyword regular expressions chain of command is an optimal solution. When n=1 the search pattern is considered a Direct search.

BRIEF SUMMARY OF THE INVENTION

Existing Boolean algebra search engines mimics inductive reasoning Watson like criminal investigation methods to find the best results, whereas the HIVE solves for the optimal answer using Sherlock Holmes deductive reasoning approach to decipher the content of each page to find the final destination within the best results.

The Internet searchable environment must be organized by the HIVE supercomputer into a chain of command comprising of superblocks, blocks, sub blocks, mini blocks and elements depending on the amount of independent variables contained in each search pattern. Each position of the chain of command belonging to the entire superset of regular expressions is stored in the 'CORE List' database. The HIVE upon detecting a new valid and unique input creates a new unit object in the 'CORE List' database.

The optimizer system is the client side of the architecture and behaves in the same manner as traditional browser that is able to identify interactive input and map the input into a search pattern. Now the search pattern module obtains the static or dynamic output derived from the most probable unit object for the search pattern. The output is sent to the end user browser and displays the top (n) result on the end user's browser require no further calculation and bypassing the search engine capacities.

Each unit object search pattern contains the independent variables to create the improved environment, the key featured association and feedback equations, and summary report object or the preprocessed top (n) results.

The left side of the brain equation is a managerial hierarchical index relationship dataset, hereinafter referred as the dataset module, which creates the improved environment using rules of linguistics and semantics. The right side of the brain equation is the secondary method, which creates the improved environment by using geospatial information. Each time, the optimizer system, detects a significant change, the dataset module, updates search pattern module. The shopping cart system interacts with the user via the Assist module that facilitates a list of assist input command instructions that refine the interactive input. Furthermore, the human brain module upon detecting commercial input inserts smart input and the corresponding GPS information. Finally, the human brain module facilitates a list of TQM personal input command instruction that eliminate the confounding elements of the search process.

The optimizer and shopping cart systems, continuously measures the interactive input and will show a (+), (++), (+++) or its graphical equivalent to notify by how much can the Assist module, can improve the search. (+) denote independent variables. When the shopping cart figures out a direct request it will display a (++++++) or its graphical equivalent to inform the user the final destination was found. The human brain module is designed to find the final destination. This is done before, now, or after a search or direct search is executed when the user is interacting with the search engine optimizer system to improve the search.

The optimizer systems has the data mining module that "Cherry Picks" the best results, and then dynamically updates the dataset module, while randomly surfing the web. The shopping cart system upon obtaining from the human brain module a direct search (++++++) command instruction that yields the final destination, facilitates the sales module that puts buyers and sellers together.

The sales module performs financial transactions using X_FOB and Y_CDIF methods. The X_FOB method furnishes free content, offers paid content using the proceeds derived from the advertisement module, and makes the paid product available upon the checkout command instruction is received, and the transaction is executed and the user is TQM satisfied.

The Y_CDIF method makes best P/U product, and Y_CDIF Rush makes best rush P/U product available upon the checkout command instruction is received, and the transaction is executed and the user is TQM satisfied.

The advertisement module displays advertisement to the end user and compensates them with credits or currency for watching or sharing their information and feedback to the corporate sponsor. The credits in turn can be used to purchase licensed P2P audio, digital and video works. The sales module maintains in real time inventory control of product and licenses, manages credits and funds, and also keeps tract of command instructions, works and advertisements the end user downloads, selects, picks, plays and reviews.

The advertisement module offers a list of corporate sponsors command instruction comprising targeted links and target ANI arranged and prioritized using supply side economics (bids). Furthermore, displays targeted advertisements to view free content, valorized optimal advertisements to view and make consent or advertisement decisions that permit the sharing of information with corporate sponsor and in turn receive credits or currency to view, download or purchase intellectual property audio, digital and video works for free or at a discounted price.

These and other features, aspects, and advantages of the invention will be further understood and appreciated by those skilled in the art by reference to the following written specification, claims and appended drawings.

BRIEF DESCRIPTION OF THE DRAWINGS

Various exemplary embodiments of this disclosure will be described in detail with reference to the following figures, wherein:

FIGS. 5A-5D present exemplary search engine optimizer system interacting with user via a browser;

FIGS. 6A-6D present another exemplary search engine optimizer system interacting with user via a browser;

FIGS. 7A-7D present another exemplary search engine optimizer system interacting with user via a browser;

FIGS. 10A-10D present an exemplary assist module diagram that measures accuracy based on command instructions;

FIGS. 11A-11D present an exemplary assist module diagram that builds assisted input;

FIGS. 12A-12D present an exemplary human brain module diagram that measures accuracy based on command instructions;

FIGS. 13A-13D present an exemplary human brain module diagram that measures accuracy based on input;

FIGS. 14A-14D present an exemplary human brain module diagram that interactively builds input;

FIGS. 15A-15D present another exemplary human brain module diagram that interactively builds input;

FIGS. 16A-16D present an exemplary human brain module diagram that builds a direct search;

FIGS. 17A-17D present an exemplary shopping cart system that measures the accuracy of smart input;

FIGS. 18A-18D present exemplary shopping cart system that measures the accuracy of personal input;

FIGS. 19A-19D present another exemplary shopping cart system that measures the accuracy of personal input;

Like reference numerals refer to like parts throughout the various views of the drawings.

DETAILED DESCRIPTION OF EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention by commonly known definitions. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
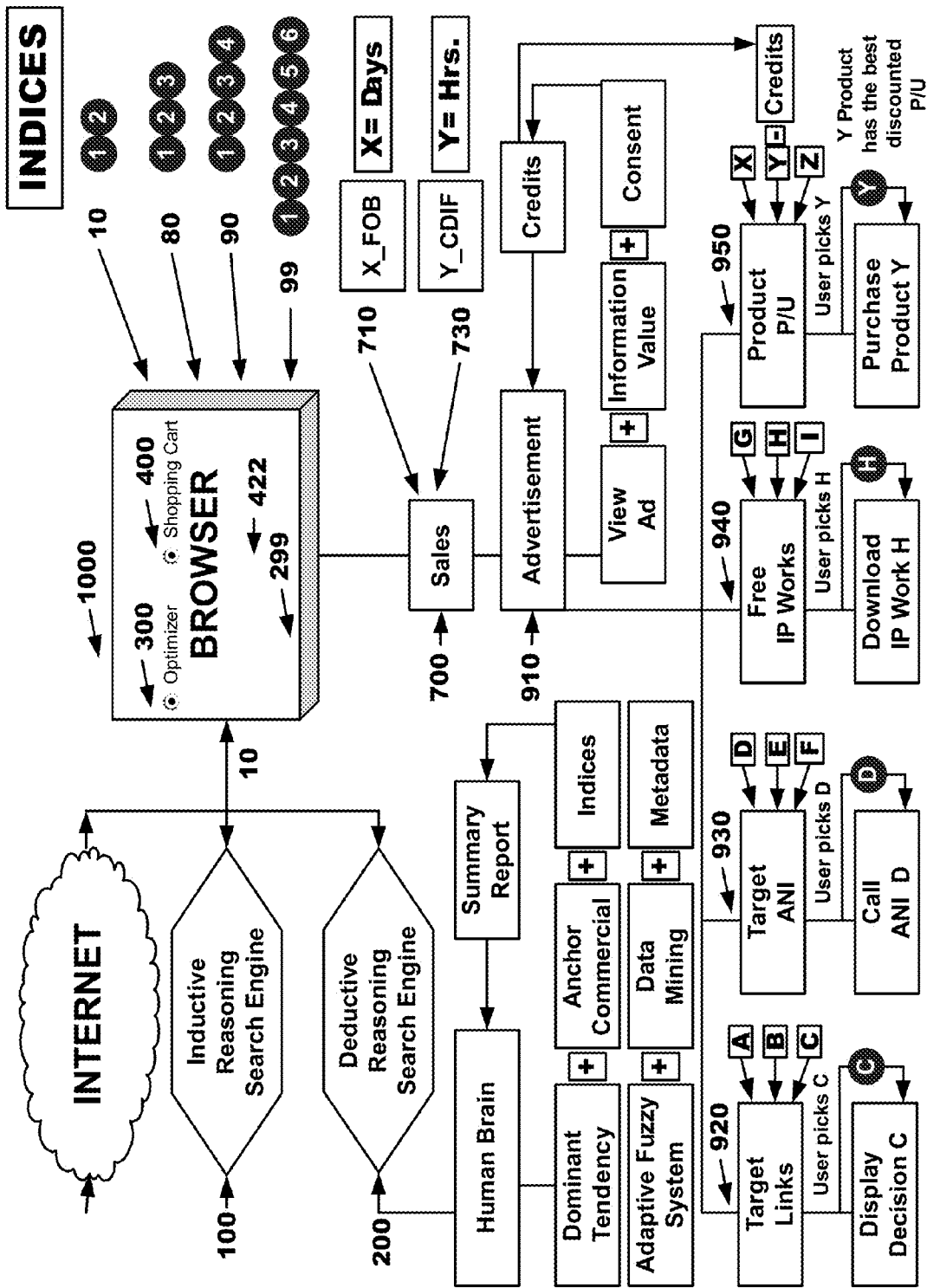
FIG. 1 presents an exemplary integrate shopping cart and optimizer system.

FIG. 1 presents an exemplary integrated shopping cart and optimizer 1000 system using the Internet searchable environment 1 comprising of an optimizer 300 and shopping cart 400 that transform interactive, assisted and smart input (10, 80, 90) into personal input 99.

The interactive, assisted, smart and personal input (10, 80, 90, 99) uses inductive reasoning 100 and deductive reasoning 200 search engines in order find index relationships that optimally shrink the size of the environment. The human brain equation correlates left brain [L] English language and right brain [R] geospatial key featured association equation that gain factors the Top Results 199, and then using deductive reasoning feedback glyphs equation 422 that attenuates content with confounding variables in order to stabilize and reduces sensitivity parameter variations due to the environment determines the final destination 299. Responsive to the interactive, assisted, smart and personal input (10, 80, 90, 99) upon determining the user's intent to perform a financial transaction the sales module 700, puts buyers and sellers together using X_FOB 710 and Y_CDIF 730 methods.

The advertisement module 910 uses interactive, assisted, smart and personal input (10, 80, 90, 99) summary report objects 299 to figure out the best target links 920, target ANI 930, targeted advertisements 940 to view free content, valorized optimal advertisements 950 to consensually view, TQM rate and make command instruction that permit the sharing of information with corporate sponsor and in turn receive credits or currency to view, download or purchase intellectual property audio, digital and video works for free or at a discounted price.

The shopping cart system 400 offering a list of target links 920 and billing the corporate link owner upon detecting the command instruction decision to display the link. For example, the end user is shown a list of corporate sponsor links (A, B, C). End user selects command instruction C, sending the user to corporate sponsor link C. The advertisement module 910 now bills corporate sponsor C, for performing the targeted advertisement.

The shopping cart system 400 offering a list of target ANI 930 and billing the corporate ANI owner upon detecting the command instruction decision that instantiates a call. For example, the end user is shown a list of corporate sponsor ANI or telephone numbers (D, E, F). End user selects command instruction D, now a call is instantiate between end user (origin) and corporate ANI D (destination). The advertisement module 910 now bills corporate sponsor D, for performing the targeted telephone call.

The shopping cart system 400 offering a list of links with free IP works 940 and bills the Site owner upon detecting the command instruction decision to display the link. For example, the end user is shown a list of corporate sponsors that will pay for a free view, listen and/or download of a licensed IP digital, audio or video work (G, H, I). End user selects command instruction H, views the corporate sponsor H advertisement. The advertisement module 910 now bills corporate sponsor H, for showcasing their advertisement, and the end user can freely view, listen and/or download the licensed IP digital, audio or video work that corporate sponsor H purchased.

The shopping cart system 400 offering a list of valorized optimal advertisement 950 with a list of available discount prices upon using coupons, watching sponsored advertisement, and or sharing personal information with corporate sponsor using X_FOB 710 and Y_CDIF 730 methods. For example, the End user is shown a list of corporate sponsors that will pay for a free view, listen and/or download of a licensed IP digital, audio or video work (X, Y, Z). End user selects command instruction Y, views the corporate sponsor Y advertisement. The advertisement module 910 now bills corporate sponsor Y, for showcasing their advertisement, and the end user can freely view, listen and/or download the licensed IP digital, audio or video work that corporate sponsor Y purchased.

At this point, the end user decides to purchase the product that paid for the free license. Instantiating a transactional advertisement and the end user will receive further credits should they consent to share information with corporate sponsor X. The shopping cart system 400 will negotiate for the best P/U, and request for additional licensing credits based on the sale. Let us suppose, corporate sponsor X campaign credits the end user with 50 cents for viewing their advertisement, and may credit the end user up to 1 dollar depending on the amount of shared information while filling a survey. Now, then what if the end user decides to purchase 100 products, and due to the dollar amount of the sale the user may wind up receiving shipping and handling free, supplement credits to purchase more licensed IP digital, audio or video works, and of course a better P/U. The shopping cart system 400 in this case can document that corporate sponsor X advertisement was displayed, and as a direct consequence the end user consented to purchase 100 products from corporate sponsor X. The advertisement module 910 and the sales module 700 collaborated in performing a documented transactional advertisement.

Figure 2:
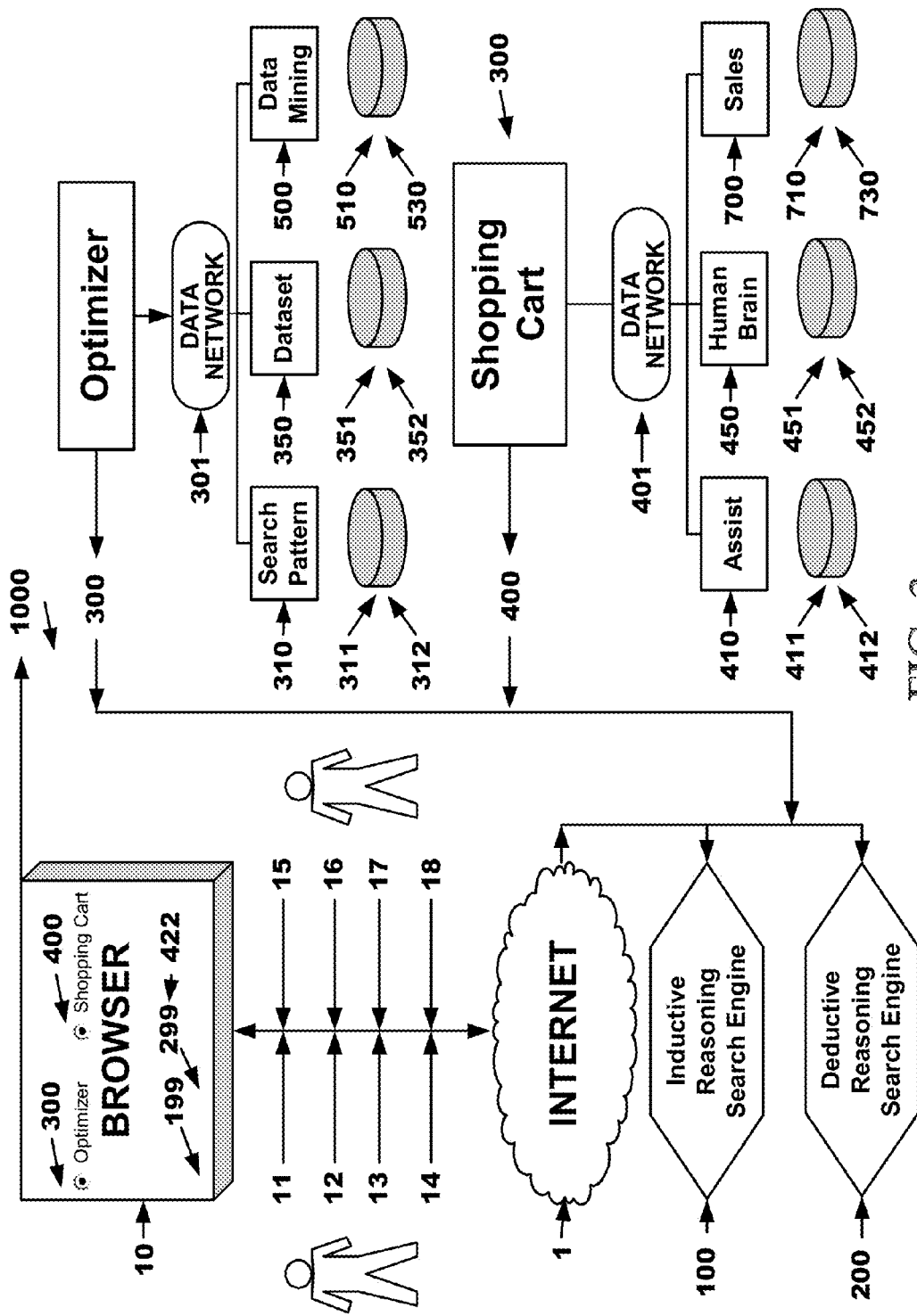
FIG. 2 presents an exemplary search engine optimizer system

FIG. 2 presents an exemplary search engine optimizer 1000 system using the Internet searchable environment 1 comprising of an optimizer 300 and a shopping cart 400 system working in parallel that includes terminals 11, 12, 13, 14, 15, 16, 17, 18 computers, inductive reasoning 100, and deductive reasoning search engines 200, computer networks 301 and 401. The optimizer system 300 has a computer network 301 consisting of search pattern 310, dataset 350, data mining modules 500, with databases 311, 312, 351, 352, 510, and 530. The shopping cart system 400 has a computer network 401 consisting of assist 410, human brain 450, and sales modules 700, with databases 411, 412, 451, 452, 710, and 730. As used herein, the term "module" is intended to include one or more computers configured to execute one or more software programs configured to perform one or more functions.

As used herein, the term "computer" is intended to include any data processing device, such as a desktop computer, a laptop computer, a mainframe computer, a parallel cluster supercomputer, a server, a hand held device, or any such device able to process data. The aforementioned components of the search engine optimizer system 1000 represent computer hardware and/or computer-implemented software configured to perform the function described in detail within below. The components of the search engine optimizer system 1000 may be implemented on one or more communicatively connected computers.

The term "communicatively connected" is intended to include, but is not limited to, any type of connection, whether wired or wireless, in which data may be communicated, including, for example, a connection between devices and/or programs within a single computer or between devices and/or programs on separate computers.

As used herein, the term "inductive reasoning" search engine 100 is intended to include any search engine supercomputer that ranks and measure the popularity score of each Site and Page belonging to Internet searchable environment 1 and performs "static searches". As used herein, the term "static search" is intended to include a single search, whereas the term "dynamic search" comprises one or more searches belonging to a session. "static searches" use glyphs, and "dynamic searches" use super glyphs. The term "glyph" comprises the statistical vector components of a valid keyword and/or clusters that are used to identify relevant pages. The term cluster is a combination of two or more words that placed in an exact order have a significant meaning. For example, the "American", "Of", "States" and "United" is best known for the cluster "United States of America". The term "super glyph" is applied to glyphs that are gain factored when using the hot/cold analyses of the incorporated references.

As used herein, the term "deductive reasoning" search engine 200 is a method for simulating the entire potential superset of interactive input 10 mapping each position (or unit object) of the chain of command with a search pattern. Each search pattern may have up to six index relationships that are used to plot each unit object that create an improved environment. Each search pattern has a key featured association and feedback used to probabilistically weight the improved environment, converting the results sets into a summary reports object that enables efficient and accurate searching. Each index relationships eliminate pages from the search process, and dependent and complement variables to gain factors pages.

Before any calculation the Internet searchable environment 1 is partitioned using language, and then divided into four quadrants, that mimic the human brain. The left brain uses linguistic and the right brain geospatial index relationships to create improved environment. The anchor or primary index relationship is the best common denominator filter.

The optimizer 300 is communicatively connected to a browser 10 by users 11, 12, 13, 14, 15, 16, 17, 18 while they are performing a web search. The search pattern module 310 scans, distills and converts interactive input during a web search into keywords and term clusters that are then transformed into vector glyphs. The dataset module 350 arranges, analyzes, and prioritizes glyphs into a managerial hierarchical index relationship.

Index relationships create improved environments. The data mining module 500 analyzes and weights each document by paragraph and sentence using the key featured association and feedback equation to figure out the content value of each page. The optimizer system 300 cherry picks the top (n) pages 199 with the highest weighted value.

The shopping cart system 400 is communicatively connected to a browser 10 by users 11, 12, 13, 14, 15, 16, 17, 18 while they are performing a web search. The assist module 410 interactively facilitates a list of assisted input 80 command instructions with keywords and term clusters that simplifies building a search, and can serves as a bona fide spellchecker when encountering a misspelled word within the input. The human brain module 450 obtains the key featured association and feedback equation 422 from the 'CORE List' and measures improved environment and figures out the final destination 299. The sales module 700 performs financial transactions using X_FOB 710 and Y_CDIF 730 methods.

In operation of the search engine optimizer system 1000, a user at the terminal 11 may input a search request using the browser 10. The search request consists of interactive input 10 created or assisted input 80 copied from existing document by the user. Having received the search request from the browser 10, the terminal 11 may communicate with the search engine optimizer system 1000 via the Internet searchable environment 1 using the optimizer system 300 in accordance with the search request.

For example, for each search request, the search pattern module 310 and dataset module 350 uses index relationship to create the improved environment. Allowing the search engine optimizer system 1000 to search the databases 311-352 via the data network 301 and retrieve search results. The data mining module 500 analyzes the search results obtained from search engines 100 and 200, and perform the process of "Cherry Picking" the best responses 199. The output display is a formatted object that may be a graphical representation of the search request that is capable of being adjusted and modified by a user and by the search engine optimizer system 1000, and will be described in greater detail below. The search engine optimizer system 1000 then communicates with the terminals 11, 12, 13, 14, 15, 16, 17, 18 via the browser 10 to display the output.

In operation of the search engine optimizer system 1000, a user at the terminal 11 may input a search request using the browser 10. The search request consists of interactive input 10 created or assisted input 80 copied from existing document by the user, or the voice text equivalent obtained from smart input 90 technologies. Having received the search request from the browser 10, the terminal 11 may communicate with the search engine optimizer system 1000 via the Internet 1 and also interact with the shopping cart system 400. For example, for each search request, the shopping cart system 400 uses the assist module 410 to identify assisted input that in turn is converted into a mathematical equation that filters the Internet searchable environment 1 into an improved environment.

The human brain module 450 creates the managerial index relationship that allows the search engine optimizer system 1000 to search the databases 411, 412, 451, 452 via the data network 401 and retrieve search results. The Sale module 700 analyzes the search results obtained from search engines 100 and 200, and finds the final destination 199. Using the X_FOB method 710 that considers each page of the Internet as a no cost In hand inventory the search engine optimizer system 1000 then communicates with the terminal 11 via the 10 to display the output as well as the retrieved search results to the user. Alternatively, puts buyers and seller together using the Y_CDIF method 730 and performs a financial transaction.

The search engine optimizer system 1000 may also provide suggestions assisted input 80 and smart input 90 command instructions to the user to index refine the dataset 350. For example, the search engine optimizer system 1000 may use the data mining module 500 to analyze the search results and sales module 700 using smart input GPS coordinates to interact with the user to obtain command instructions that eliminates confounding variables to create an improved dataset 350. The improved dataset 350 and corresponding statistical information becomes the output object that is displayed on the user's browser 10.

It should be understood that responsive to the interactive input, the terminal 11 may send the changes to the search engine optimizer system 1000, repeatedly until the user is satisfied with the search results.

Responsive to the interactive input the terminal 11 upon determining the user's intent to perform a financial transaction the search engine optimizer system 1000, puts buyers and sellers together using X_FOB 710 and Y_CDIF 730 methods incorporated by reference.

Figure 3:
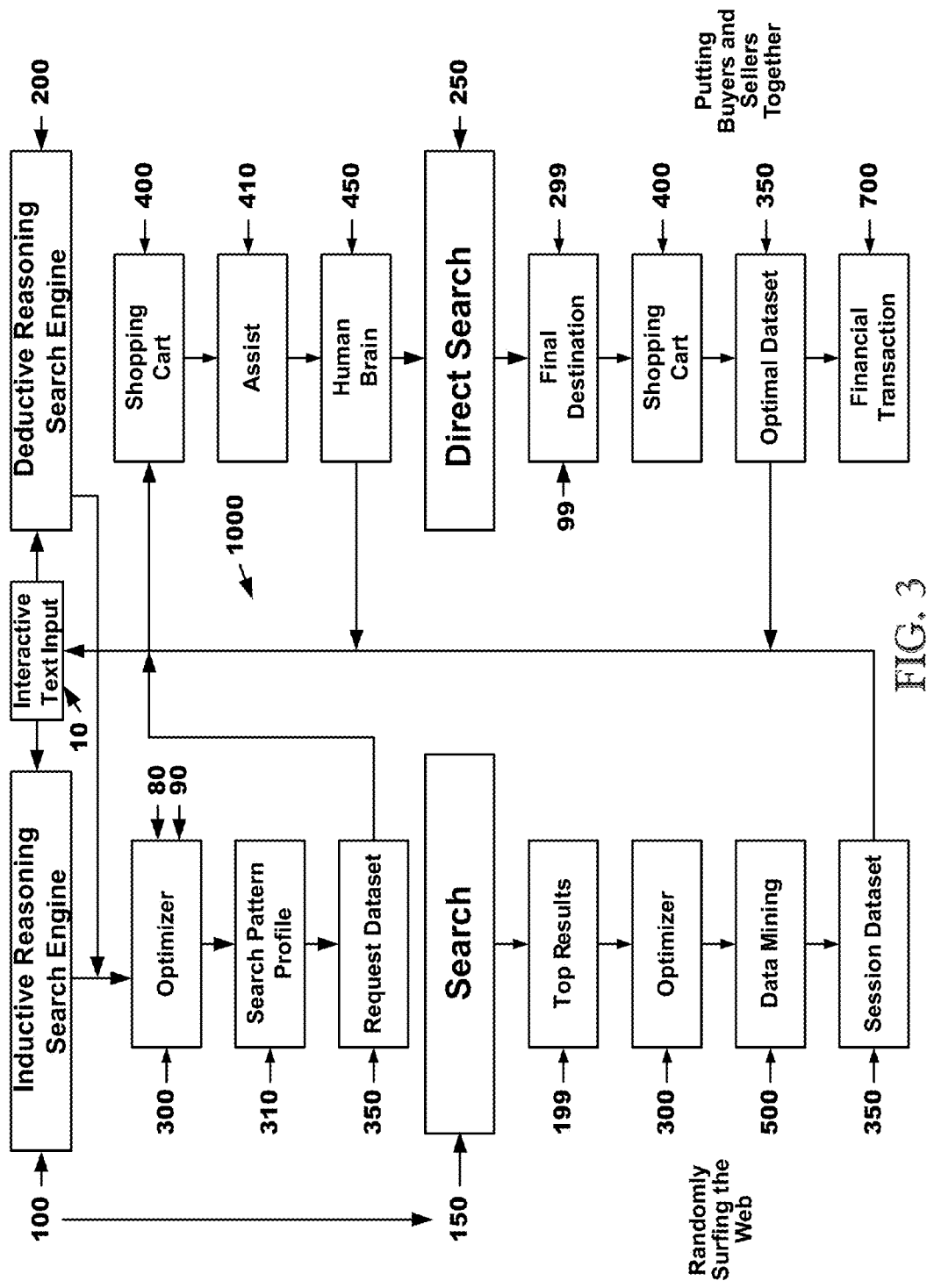
FIG. 3 presents a flow diagram outlining an exemplary process for the search engine optimizer system.

FIG. 3 presents a flow diagram of the search engine optimizer system 1000 working with an inductive reasoning search engine 100, (e.g. BING®, GOOGLE® or YAHOO®) and/or Deductive reasoning search engine 200, (e.g. XCommerce). The optimizer system 300, helps a user using an inductive reasoning search engine 100 to interactively build a search request that is broken up into keywords and clusters that are converted into glyphs. The optimizer system 300 creates a search pattern profile 310 based on the interactive input 10 entered by the user.

The search pattern profile 310 is a mathematical equation representation of the interactive input entered by the user. The search pattern profile 310 is converted into a request dataset 350. The request dataset 350 is a managerial hierarchical relationship index that maps the improved environment by index refining irrelevant pages and finding dependent and complement variables also known as key featured association to gain factor relevant pages.

Search Patterns

Each search pattern contains index relationship that map a unit object to the superset of keyword regular expressions chain of command. The index refinement process eliminates web pages from calculation to map the improved environment and creates a partial master index that ranks each page and site. Each search pattern stores the preprocessed output that is displayed on the end user's browser absent of any calculation by passing search engine capacities, and the key featured association and feedback equations that are used to measure pages.

The optimizer system 300, can also help a user using a deductive reasoning search engine 200 to interactively build a search request. Upon detecting changes in the interactive input the shopping cart system 400, is made available with a list of assisted and smart input command instructions. In this way, assisted input command instructions are readily available to begin a request. The search engine optimizer system 1000 will search in its database for assisted input 80 and smart input 90 command instructions. In this case, the assist module 410 displays a list of valid glyph that will serve as the basis of the search. This permits the end user to type . . . Am, and selects from the valid list of glyphs "American" and then to continue by typing C and from the list of valid glyphs selects "American Civil War". The assisted input 80 "American Civil War" becomes text input.

For example, the assist module 410 converts the commercial glyph "Walmart" (WALMART®) and incorporates the user's GPS location coordinates to create smart input 90. The newly created smart input 90 "Walmart" (WALMART®) becomes text input.

At any time the end user can click on the shopping cart graphical display and instantiate the human brain module 450, to help the end user using the latest request dataset 350 to create new set of command instructions that improve the accuracy and precision of the search engine optimizer system 1000. The accepted end user's instructions yield: Search 150 or direct search 250.

The search 150 is sent to either an inductive reasoning 100 or deductive reasoning search engine 200, and the top results 199 are displayed on the end user's terminal. The optimizer system 300 uses the data mining module 500 to analyze the top results 199 and creates a session dataset 350 with dynamic instead of statics values glyphs, since the first request failed to reach the final destination 299. This iterative process of randomly surfing the web may be repeated until the user is satisfied with the top results 199 that now becomes the final destination 299 and stops requiring further refinement.

The direct search 250 bypasses randomly surfing the web process and maps the final destination 299 for a final decision. Now, that the personal input 99 precisely plots output we need to know what the user really wants. The financial transaction module 700 can now perform X_FOB, a free of cost inventory in hand, financial transaction by furnishing the checkmate combination information the user wants, for example, the address Information, telephone and directions to a dusiness location. In addition, once the final destination 299 is found the shopping cart 400 becomes a traditional cart using the financial transaction module 700 and based on the user's approved instructions puts buyer (user) and seller (best priced supplier) together and performs a Y_CDIF transaction. Note: free downloads are considered X_FOB financial transactions since they are considered free of cost Inventory In Hand.

Figure 4:
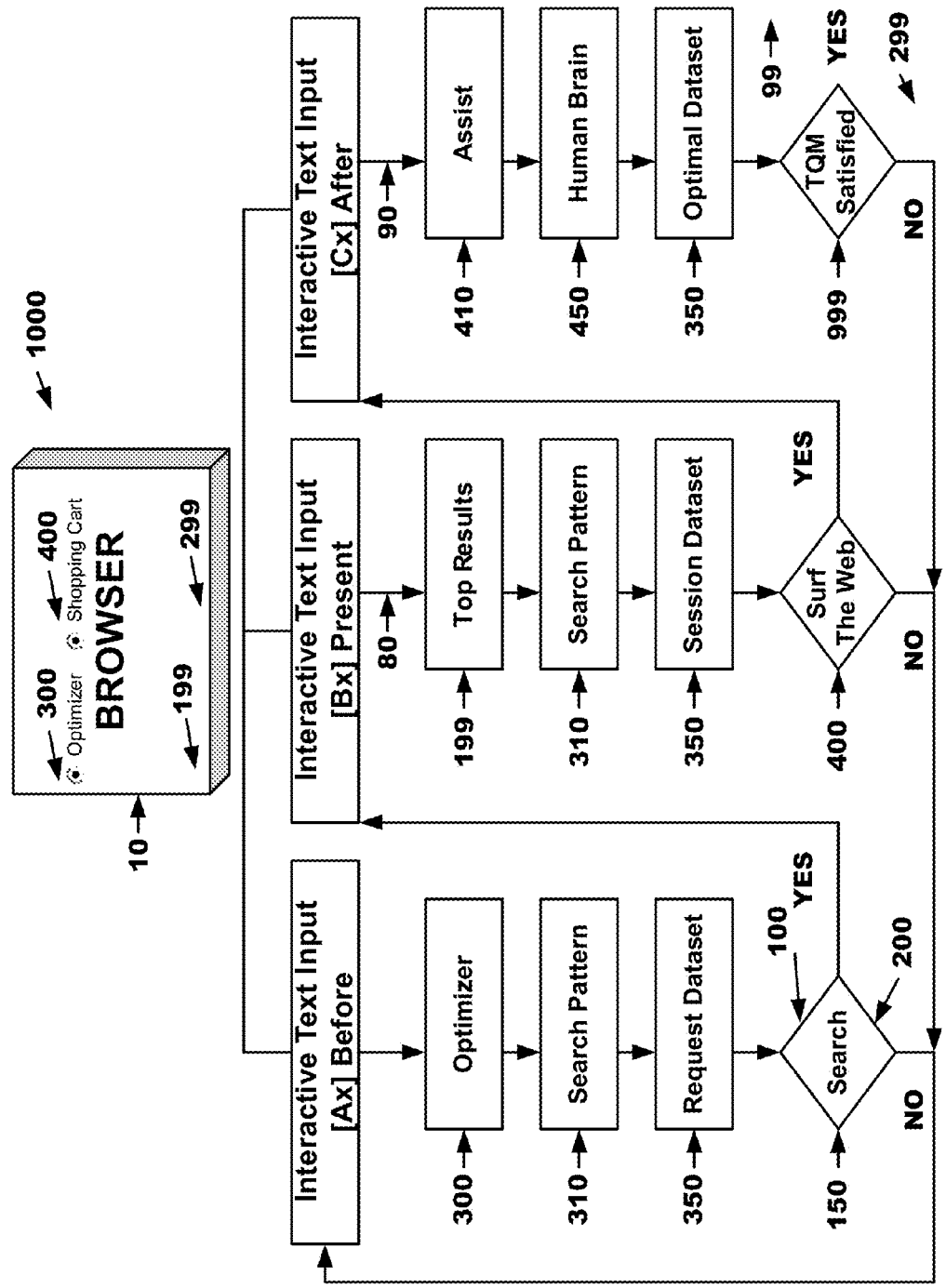
FIG. 4 presents an exemplary block diagram of the optimizer subsystem.

FIG. 4 presents an exemplary block diagram of the search engine optimizer 1000 subsystem, interacting with a user using a browser 10 in real time. Interactive analysis means at incipiency. In this case, the optimizer 300 and shopping cart 400 systems are continuously analyzing output and translating the information into the computerized version of the Mayan Cholti language, that uses the left side [L] and right side [R] of the brain to break down an idea. First: we must analyze the tense of the analysis of the interactive text analysis, and assign accuracy limits. Any initial analysis [Ax] before the search command instruction is sent to a search engine 100 or 200, and the accuracy is the lowest since it is an estimate.

A second analysis [Bx] that is automatically, performed once a search engine 100 or 200 responds with the top results 199. A post factum analysis [Cx] is performed by the human brain module 450, to identify additional key features associations. Thus, the initial analysis [Ax] is before, the second analysis [Bx] is present, and the post factum analysis [Cx] is after interactive input that solves for the top results 199.

A personal input [Dx] is the new features to the cross references related applications. The personal input [Dx] cherry picking process mirrors what Sir. Isaac Newton did by assigning limits such as zero and infinity when developing modern calculus to improve Euclidian geometry and later the quantum physics advancements Albert Einstein did for non-Euclidean geometries in particular the theory of general relativity.

To reach 100% precision, we must remove the confounding components of the search, these are assumptions that search engines 100 and 200 do not take into account, these assumptions are based on Total Quality Management levels of customer satisfaction, and thus require the system to ask and obtain confirmation command instruction, to solve for direct searches that yield the final destination 299.

What is new for the search engine optimizer system 1000, consists of the shopping cart system 400 functions that permit during the initial analysis [Ax] before, the second analysis [Bx] present, and the post factum analysis [Cx] after to eliminate the confounding variables of the search process, that will permit to solve for the final destination 299. Based on the tense the search process has implicit confounding variables: the initial analysis [Ax] before has at least 3, the second analysis [Bx] present has at least 2 and the post factum analysis [Cx] after has at least 1 confounding variables and thus Table 7 applies.

[Ax] interactive input: 2 indices with 86% accuracy and 1 million pages.

[Bx] assisted input: 3 indices with 95% accuracy and 10,000 pages.

[Cx] smart input: 4 indices with 99% accuracy and 100 pages.

[Dx] personal input: 6 indices with 100% accuracy and 1 page.

Table 7: Precision Limits by Input Type

The interactive input [Ax] before: The optimizer system 300 scans the browser's interactive input 10, and the search pattern module 310 breaks the input into keywords and optimally into term clusters that are transformed into glyphs that are then arranged in a managerial hierarchical manner upon identify the independent variables within a request that will be used to create a request dataset 350. This process is done until the end user performs a search command instruction 150 that sends the interactive input to a search engine 100 or 200.

The assisted input [Bx] present: The optimizer system 300 now scans the top results 199, and the search pattern module 310, analyzes each page to find key featured associations and the best fit paragraph content and dynamically calculates, prioritizes, arranges and find missing gaps of information within the search pattern that will be used to create a session data 350. The static glyphs become dynamic super glyphs and the interactive input 10 becomes assisted input 80, since the search engine optimizer system 1000 will analyze at least one request belonging to a session. At this point the end user can quit the search, or use the shopping cart system 400.

The smart input [Cx] after: A NO command instruction means the user will continue to randomly surf the web and a YES activates the Assist module 410 that interact with the human brain module 450 triggering total quality management customer satisfaction command instructions feedback that eliminates confounding variables and creates the optimal dataset 350. If the optimal dataset 350 has NO checkmate combination that yields the final destination 299 the user continues randomly surfing the web the assisted input 80 becomes smart input 90. If YES the smart input 90 becomes personal input 99 and the user is TQM Satisfied 999.

Hereinafter, TQM command instructions will now become independent variables that will be used by to solve for the final destination and thus interactive text input will no longer consist of text and analysis of the top results 199, but will include decisions that eliminate confounding elements of the search process.

FIGS. 5 to 7 presents an exemplary search engine optimizer 1000 system interacting with user via a browser, where FIG. 5 reflects the flow of the original reference application, FIG. 6 its continuation and FIG. 7 what is new. Each of these figures interact with a browser 10 and the user discretion through assisted input 80 that store and display the interactive text input of an user while directly and/or randomly surfing the web. Each keyword and cluster term is converted into a glyph 20, where the first letter the side of the brain that is preferably used when solving for a solution. E denotes English language based and is used by the left side of the brain, G denotes geospatial and is used by the right side of the brain, and M denotes mixed and can be used by both sides of the brain, and D denotes total quality management decision that eliminate confounding variables of the search process.

Each request is assigned an inductive reasoning mass value 30 that ranges from 0 to 8 (where 8 reflects certainty, and 0 the spaghetti phenomena of chaos and anarchy). Each request is assigned an inductive reasoning estimated environment size value 31 that ranges from 1 to one trillion (where 1 reflects certainty, whereas and one trillion (2^40) the spaghetti phenomena of chaos and anarchy). Each request is assigned an inductive reasoning logic grid 32 and gamma function equation 33. Each request is assigned a deductive reasoning mass value 40 that ranges from 0 to 8 (where 8 reflects certainty, whereas 0 relevant). Each request is assigned a deductive reasoning estimated environment size value 41 that ranges from 1 to one billion (2^30) (where 1 reflects certainty, whereas and one billion what is relevant). Each request is assigned a deductive reasoning logic grid 42 and gamma function equation 43.

Using the number of independent variables within a request an inductive reasoning category 50 and a deductive reasoning category 60 are displayed as follows:
0=Vague,
1=Concise,
2=Precise,
3=Optimal and
4=Answer searches.

Optimal and Answer searches have at least one probabilistic total quality management command instruction that enables them to exceed the 86% accuracy threshold.

FIGS. 5 through 7 highlight the interactive text input process of a user to create the final request "American Civil War Robert Lee Gettysburg". (A) Start with the user starting the process typing a single keyword in this case "American". (B) The user continues to typing interactive input 10 or uses assisted input 80 to improve the text input to "American Civil War" the term cluster. (C) The user continues to typing in the browser 10 or uses assisted input 80 to improve the text input to "American Civil War Robert Lee" by adding the "Robert Lee" term cluster. (D) The user continues to type interactive input 10 or uses smart input 90 to improve the input to "American Civil War Robert Lee Gettysburg" by adding the geospatial and relevant "Gettysburg" keyword.

Cholti converts the keywords into term clusters 70 that is part of the search pattern, where M1+E1+E2 becomes C1 or "American Civil War" and E3+E4 becomes C2 or "Robert Lee". C1 is converted into assist glyph 411, that becomes the primary index relationship that should yield the final destination, and thus the final destination will include the assisted input 80 "American Civil War" within its content. During the interactive process the system determines that the two clusters 70 and M2 or "Gettysburg" are directly related. Since, M2 or Gettysburg is geospatial or smart input 90 the system creates an assist event 412 or "Battle of Gettysburg", and finds the missing gaps of information and by adding Pennsylvania, Gettysburg GPS location coordinates, Jul. 1, 1863 time stamp, order of battle, and historic sites.

Now, Cholti uses the smart input 90 to perform the user's search, and if the user wants generic description of the Battle of Gettysburg, the answer will reside in an encyclopedia or high quality content site, otherwise the search will continue and the user will continue to surf the web, until the real purpose of the search is known.

Figure 8:
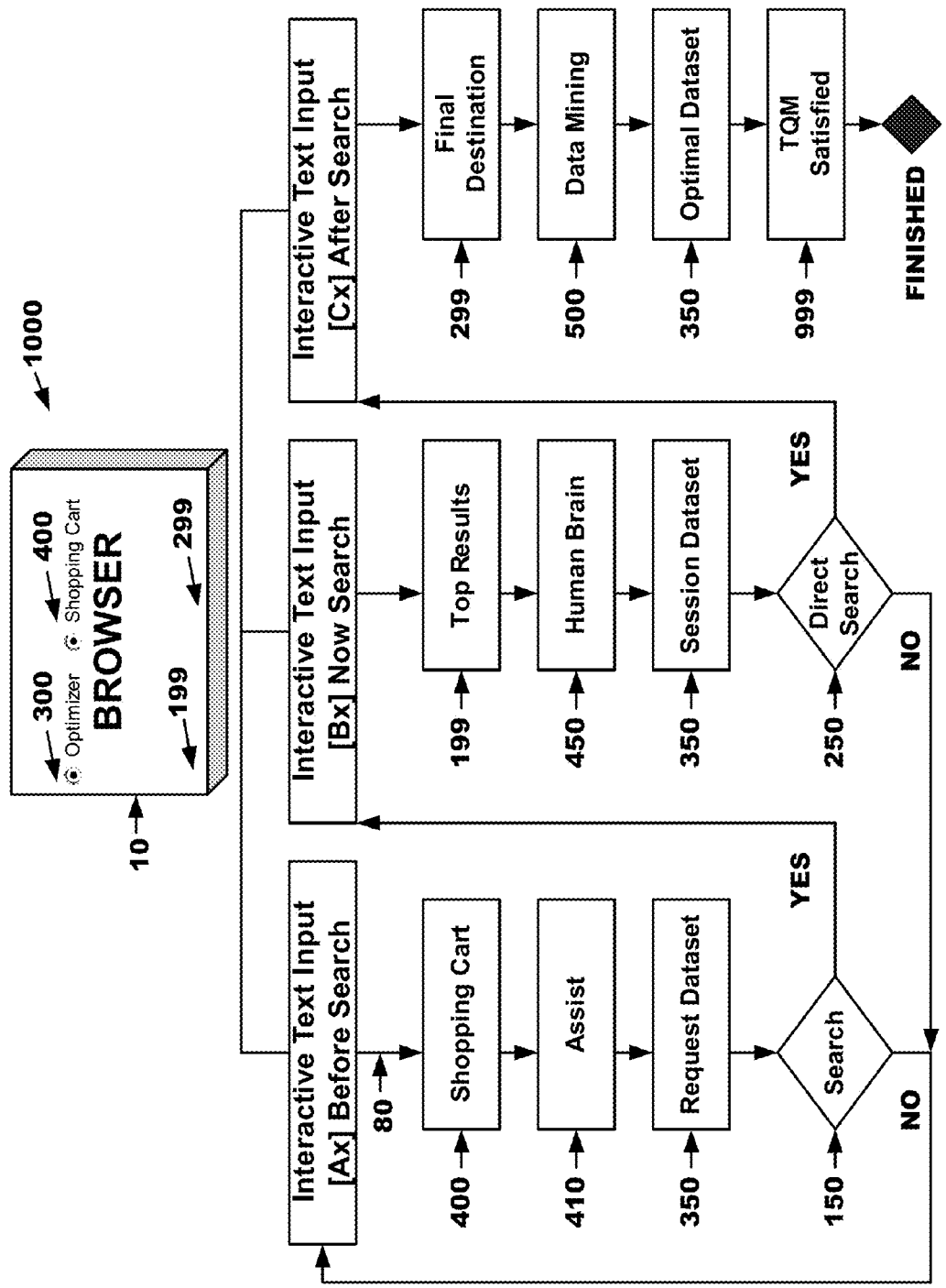
FIG. 8 presents an exemplary block diagram of the shopping cart system.

FIG. 8 shows an exemplary block diagram of the shopping cart system 400 as the search engine optimizer 1000 gathers the browser's interactive input 10, while randomly surfing the web. The interactive input [Ax], before the user selects from a list of assisted input 80 command instruction offered by the assist module 410 and then the optimizer subsystem 300, creates a request dataset 350 using the selected command instruction corresponding managerial index relationships. The assisted input [Bx], now the user command instructs a search 150, and will receive as output the top results 199 and will continue to surf the web, with assistance of the human brain module 450, that will dynamically match/merge at least one request into a session, and create a session dataset 350, and will gain factor key featured association based on their frequency and nearness to the managerial index relationships.

The human brain module 450 will offer additional keywords and decisions as command instruction to figure out a Direct request 250 that yields the final destination 299. Each command instruction is accompanied with the content derived from the analysis of the top results 199 and the corresponding gained factor value (from 0 bad to 10 optimal) of the session dataset 350. Now the data mining module 500 analyzes the final destination 299, since the user no longer need to randomly surf the web. Using the smart input [Cx] after interactive text input creates an optimal dataset 350 that also includes the user accepted command instructions, and thus the input now maps and plots the output. The search process is finished and the user is TQM satisfied 999.

FIGS. 9 through 19 have the following common elements: Glyph conversion 20 of the user interactive text input, and the corresponding inductive reasoning search statistics mass 30, estimated environment size 31, displayed output logic grid 32, gamma function 33, and accuracy 51 and immediately after the corresponding deductive reasoning search statistics mass 40, estimated environment size 41, displayed logic grid 42, and gamma function 43 and accuracy 61.

By default the search engine optimizer system 1000, updates and displays inductive reasoning statistics logic grid 32 and accuracy 51 as the end user interactively inputs text, and upon detecting a valid request dataset 350 and displays deductive reasoning statistics logic grid 42 and accuracy 61. The search engine optimizer system 1000 uses an accuracy algorithm from (0-100.00) based on the request dataset 350 and estimated environment size to display 51 and 61 accuracy output as an integer ##% or float ##.## % value format. The system converts keywords into cluster 70, such as M1+E1+E2 into C1 or "American Civil War".

The assist module 410 decisions are as follows: T1 or 71 represents a keyword or term cluster. T3 or 73 represents an event comprising of two independent variables. T2 or 72 enhances T1 or 71 by having a quality filter to gain factor pages. T4 or 74 enhances T2 or 72 by having quality filter to gain factor pages. T3 or 73 and T4 or 74 from the command instructions of the assist list 421 figures out and expands the left brain [L] and right brain [R] glyph equations with the feedback glyphs equation 422 or N1 that attenuates content with confounding variables in order to stabilize and reduces sensitivity parameter variations due to the environment.

Human brain module decisions 450 are as follows: TQM personal input command instruction D1 or 81 represents a commercial glyph. TQM personal input command instruction D3 or 83 represents a commercial glyph with default GPS coordinates. TQM personal input command instruction D2 or 82 enhances TQM personal input command instruction D1 or 81 by having a quality filter to gain factor pages. TQM personal input command instruction D4 or 84 enhances TQM personal input command instruction D2 or 82 by having quality filter to gain factor pages. TQM personal input command instruction D5 or 85 is an exact decision that creates a direct search 250, and yields the final destination 299.

FIG. 9 presents an exemplary Assist module 410 diagram that measures accuracy. In FIG. 9A, the user using assisted input 80 selects an assist glyph 411 and the command instruction 71 makes the interactive text input "Napoleon Bonaparte" or C1 that is a cluster 70. In FIG. 9B, the user using assist glyph 411 selects a high quality glyph 412 and the command instruction 72 makes the text input "Napoleon Bonaparte". In FIG. 9C, the user picks an assist event 413 to improve FIG. 9 A by adding "Waterloo" and the command instruction 73 makes the interactive text input "Napoleon Bonaparte Waterloo". In FIG. 9D, the user picks a high quality event 414 to improve FIG. 9 B by adding "Waterloo" and the 74 command instruction makes the interactive text input "Napoleon Bonaparte Waterloo".

Figure 9A:
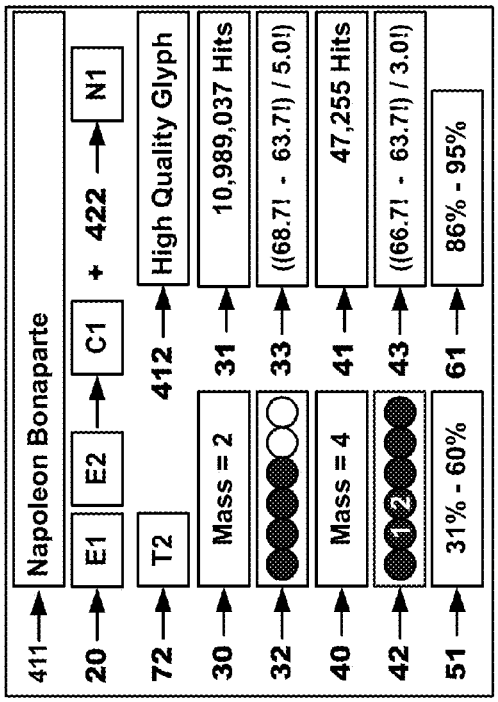
FIGS. 9A-9D present an exemplary assist module diagram that measures accuracy based on assist input.
Figure 9B:
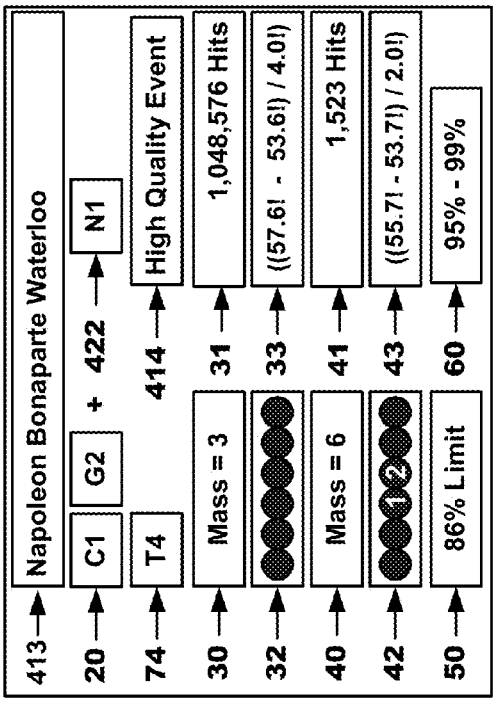
Figure 9C:
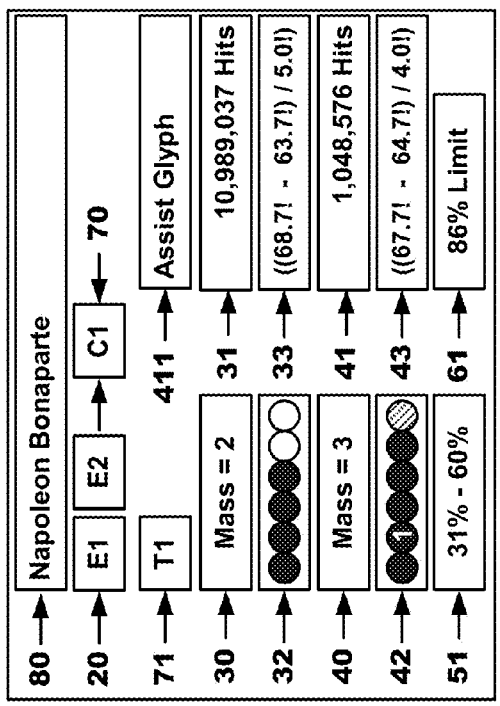
Figure 9D:
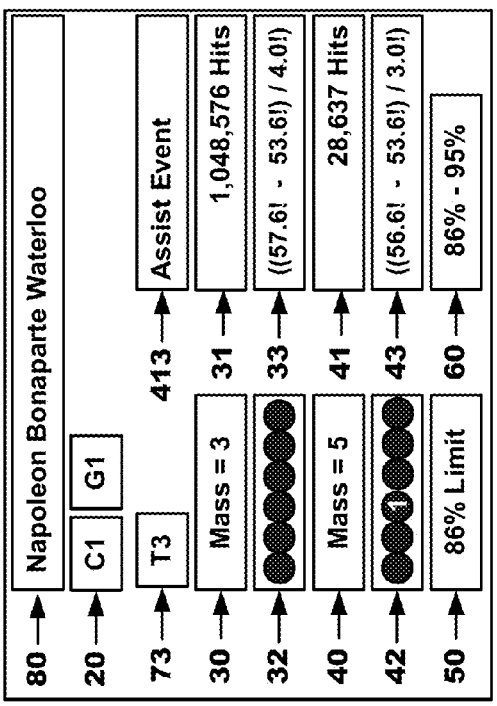

Both FIG. 9C and FIG. 9D use request dataset 350 and corresponding managerial index relationships to build the left brain [L] and right brain [R] equations based on the smart input 90 historical event that took place in Waterloo, Belgium on Jun. 15, 1815, and yes Emperor of France Napoleon Bonaparte and Allied Commander Duke of Wellington as well as their chain of command are part of the equation used to gain factor the content of the top results 199. FIG. 9 presents the interaction input [Ax] before analysis. Both FIG. 9B and FIG. 9D have feedback glyphs equation 422 or N1 that attenuates confounding variables when vectoring content value.

FIG. 10 presents an exemplary assist module 410 diagram that measures accuracy based on command instructions. In FIG. 10A, the user using assisted input 80 selects an assist glyph 411 and the command instruction 71 makes the interactive text input "Napoleon Bonaparte". In FIG. 10B, the user using assist list 421 selects an assist glyph 411 and the command instruction 71 makes the interactive text input "Napoleon Bonaparte". In FIG. 10C, the user using assist glyph 411 selects a high quality glyph 412 and the command instruction 72 makes the interactive text input "Napoleon Bonaparte". In FIG. 10D, the user using assist list 421 selects a high quality glyph 412 and the command instruction 72 makes the assisted input 80 "Napoleon Bonaparte". Both FIG. 10C and FIG. 10D have feedback glyphs equation 422 that attenuates confounding variables when vectoring content value.

FIG. 11 presents an exemplary Assist module 410, diagram that interactively builds input. In FIG. 11A, the user using assisted input 80 selects an assist event 413 and the command instruction 73 makes the interactive text input "Napoleon Bonaparte Waterloo". In FIG. 11B, the user uses assist list 421 to correlate "Napoleon Bonaparte" and "Battle of Waterloo" into and assist event 413 and the command instruction 73 makes the interactive text input "Napoleon Bonaparte Waterloo". In FIG. 11C, the user using assist event 413 selects a high quality event 414 and the command instruction 74 makes the smart input 90 "Napoleon Bonaparte Waterloo". In FIG. 11D, the user uses assist list 421 to correlate "Napoleon Bonaparte" and "Battle of Waterloo" into high quality event 414 and the command instruction 74 makes the input "Napoleon Bonaparte". Both FIG. 11C and FIG. 11D have feedback glyphs equation 422 that attenuates confounding variables when parsing and vectoring content value. "Napoleon Bonaparte Battle of Waterloo" is valid.

FIG. 12 presents an exemplary human brain module 450 diagram that measures accuracy based on command instructions. In FIG. 12A, the user using assisted input 80 selects commercial glyph 451 and the command instruction 81 makes the interactive text input "Walmart" (WALMART®). In FIG. 12B, the user using commercial glyph 451 selects a high quality glyph 452 and the command instruction 82 makes smart input 90 "Walmart" (WALMART®). In FIG. 12C, the user picks a commercial event 453 to improve FIG. 12A by adding leg (A) (origin) GPS coordinates and the command instruction 83 makes the interactive text input "Walmart" (WALMART®)+leg (A)". In FIG. 12D, the user picks a high quality event 454 to improve FIG. 12C by adding leg (B) (destination) GPS coordinates and command instruction 84 makes smart input 90 "Walmart" (WALMART®)+ legs (A+B)".

FIG. 13 presents an exemplary human brain module 450 diagram that measures accuracy based on input. In FIG. 13A, the user using assisted input 80 selects event 451 and the command instruction 81 makes the interactive text input "American Civil War+C2", where C2 is a valid key featured association. In FIG. 13B, the user using event 451 selects a combo group 452 and the command instruction 82 makes the input "American Civil War+C2+C3", where C3 is a valid key featured association. In FIG. 13C, the user the combo group 452 in FIG. 13B by selecting D1 the first decision 453 and the command instruction 83 makes the input "American Civil War+C2+C3+D1", and D1 is the first decision 453. In FIG. 11D, the user improves the first decision 453 in FIG. 11C by selecting D2 the next decision 454 and command instruction 84 makes assisted input 80 "American Civil War+C2+C3+ D2", and D2 is the next decision 454.

FIG. 14 presents an exemplary human brain module 450 diagram that measures input. In FIG. 14A, the user using assisted input 80 selects commercial glyph 451 and the command instruction 81 makes the smart input 90 "Walmart" (WALMART®), where D1 is a valid zero cluster. In FIG. 14B, the user using commercial glyph 451 selects a high quality commercial glyph 452 and the command instruction 82 makes the smart input 90 "Walmart" (WALMART®). In FIG. 14C, the user picks a commercial event 453 to improve FIG. 14B by validating leg (A) (origin) GPS coordinates and the command instruction 83 makes the smart input 90 "Walmart" (WALMART®)+leg (A)". In FIG. 11D, the user picks a high quality event 454 to improve FIG. 14C by validating leg (B) (destination) GPS coordinates and the command instruction 84 makes the smart input 90 "Walmart" (WALMART®)+legs (A+B)".

FIG. 15 presents another exemplary human brain module 450 diagram that interactively builds input. In FIG. 15A, the user using assisted input 80 selects assist glyph 451 and the command instruction 81 makes the interactive text input "American Civil War+C2", where C2 is a valid key featured association. In FIG. 15B, the user using assist event 452 selects a combo group and the command instruction 82 makes the text input "American Civil War+C2+C3", where C3 is a valid key featured association. In FIG. 15C, the user using combo group 453 selects D1 the first decision and the command instruction 83 makes the assisted input 80 "American Civil War+C2+C3+D1", and now D1 is the first decision 453.

In FIG. 15D, the user improves the first decision 453 of FIG. 15C by selecting D2 the next decision 454 and the command instruction 84 makes the assisted input 80 "American Civil War+C2+C3+D2", and D2 is the next decision 454.

FIG. 16 presents an exemplary human brain module diagram that builds a direct search. FIG. 16A is a continuation of FIG. 16D, where the user created a high quality commercial event 454 by selecting an exact decision 455 and the command instruction 85 makes a direct search 210 that yields to the final destination, in this case the personal input 99 has a map with driving directions to a particular store. FIG. 16B is another continuation of FIG. 16D, where the user is linked to the sales module 700 enabling X_FOB 710 and Y_CDIF 730 financial transaction methods. FIG. 16C is a continuation of the personal input 99 "American Civil War+C2+C3+D2", where D2 is the next decision 454, and C2 and C3 are related key featured associations of the "American Civil War" in this case C2 is Robert Lee, and C3 is the Battle of Gettysburg, and the command instruction 85 makes an exact decision 455.

Once the shopping cart system 400 creates a direct search 210, the sales module 700 is activated and enables the X_FOB 710 and Y_CDIF 730 financial transaction methods. In FIG. 16D the user makes a Purchase Decision 456 and the command instruction 86 commercializes with personal input 99 that permits the user to perform a financial transaction.

At this point, the search process is over, and the sales module 700 puts buyers and sellers together and now behaves as an online shopping cart, since the user performed a Purchase Decision 456. The final destination 299 obtained from the exact decision 455 contains the personal input 99 that possess the destination Hotel C geospatial information, and also the user's point of origin, in this case a X_FOB 710 method reservation is offered, or alternatively a Y_CDIF 730 Vacation trip is offered that includes air travel, car rental, insurance and room accommodation information.

FIG. 17 presents an exemplary shopping cart system that measures the accuracy of smart input 90. FIG. 17A and FIG. 17C are examples of the user interaction with the shopping cart system 400 to obtain an exact decision 455 and the command instruction 85 makes a personal input 99 that builds a direct search 250. In FIG. 17A the shopping cart system 400 transforms the commercial cluster "Walmart" (WALMART®) or C1 into Z1 the Zero Cluster or "Walmart" (WALMART®).com. In FIG. 17C the shopping cart system 400 transforms the cluster "American Civil War" or C1 into Z1 the Zero Cluster or "American Civil War"+High quality definition. Once, the shopping cart obtains personal input 99 with an exact decision 85 or D5, the system reaches optimal precision.

FIG. 17B measures the accuracy of FIG. 17A, and FIG. 16 D measures the accuracy of FIG. 17C, in both cases the personal input 99 is measured against the final decision 85.

FIG. 17A is based on smart input 90 "Walmart" (WALMART®) the shopping cart offers a list of options such as home page, location A to Z based on the IP Address, news, and high quality definition searches with an accuracy of 96% to 99%. Now, to reach certainty the shopping cart system 400 obtains the personal input 99 with an exact decision 85 that creates a direct search 210 that yields the final destination 299.

FIG. 18 presents exemplary shopping cart system that measures personal input 99. In FIG. 17A the user using assisted input 80 selects assist glyph 451 and the command instruction 81 makes the interactive text input "Walmart" (WALMART®), where "Walmart" (WALMART®) is transformed into the commercial cluster C1. When the user selects the search 150 command instruction, "Walmart" (WALMART®) or the commercial cluster C1 is transformed into a Zero Cluster or Z1 for "Walmart.com" (WALMART®) that yields the top results 199.

Furthermore Zip Code of the IP Address GPS coordinates becomes the smart input 90 point of origin in order to create a map that shows locations prioritized based on distance. FIG. 18B the search engine optimizer system determines that FIG. 18A has two direct search 210 paths and analyzes both outcomes. The first direct search 210 path, upon receiving the search 150 command instruction, becomes an inductive reasoning assist search using Zero Cluster Z1 or "Walmart.com" (WALMART®) to figure out the first final destination 299. The second direct search 210 path, upon receiving the search 150 command instruction, becomes an inductive reasoning smart input 90 using zip code of the GPS coordinates as right brain [R] checkmate equation used to figure out the second final destination 299. The first path uses assisted input 80 and yields "Walmart" (WALMART®).com, and the second path uses smart input 90 and yields Location A. Since, two or more final destination 299 exist, one or both of the path are automatically confounding. This is the reason of the present invention is to figure out the personal input 99 using the TQM command instruction that identify the true final destination 299.

In FIG. 18C the user using assisted input 80 selects the assist glyph 451 and the command instruction 81 makes the interactive text input "American Civil War". When the user selects the search 150 command instruction, the input is sent to a search engine and the output displayed becomes the top results 199. FIG. 18D the search engine optimizer system determines that FIG. 18C has two direct search 210 paths and analyzes both outcomes.

The first direct search 210 path, upon receiving the search 150 command instruction, becomes an inductive reasoning assisted input 80 high quality definition using the commercial cluster C1 or "American Civil War" to figure out the first final destination 299. The second direct search 210 path, upon receiving the search 150 command instruction, becomes an inductive reasoning page rank search using popularity score used to figure out the second final destination 299.

The first path uses assisted input 80 and yields Encyclopedia_A.com, and the second path uses the popularity score yields Site A. Since, two or more final destinations 299 exist, one or both of the path are automatically confounding. This is the reason of the present invention is to figure out the personal input 99 using TQM command instruction that identify the true final destination 299.

The personal input 99 takes into account the left brain [L] equation (E1 to EN) key featured associations, and right brain [R] equation (G1 to GN) key featured association, and then gain factors the top results 199, and determines that Site B has the best content and is the final destination 299. Finally, site B is further justified by using the deductive reasoning means of the feedback glyphs equation 422 or N1 that attenuates content with confounding variables in order to stabilize and reduces sensitivity parameter variations due to the environment.

FIG. 19 presents another exemplary shopping cart system that measures personal input 99. FIG. 19A shows the user select "Walmart" (WALMART®) that becomes the Zero Cluster Z1 or "Walmart" (WALMART®).com", using smart input 90, search engine optimizer system 1000, determines using the data mining module 500 that confounding elements to the search process exist, and minimally the leg A or point of origin zip code is required to improve the search. FIG. 19B the user selects personal input 99 that contains an exact decision 85, validating legs (A+B), origin and destination, and yields the final destination 299.

Search Becomes a Sale

Once input maps and directly plots the output the search process is over. Now, the shopping cart system 400, offers the sales module 700 that puts buyers and sellers together using X_FOB 710 and Y_CDIF 730 means provided a financial transaction is required. By default the lion share of most final destination 199 is free content, address information or mapping instructions and sales module 700 is skipped. For the exceptions FIG. 20 and FIG. 21 incorporate the X_FOB 710 and Y_CDIF 730 means to further improve TQM Satisfaction 999.

FIG. 19C shows the user select "American Civil War", using assisted input 80, search engine optimizer system 1000, expands the mathematical equation using the data mining module 500 to drill and find within the content of the top results 199, what the user is searching. In this case, a list of command instruction will appear in the user's terminal based on KFA (key featured associations), military leaders, and historical events found within the top results 199.

Deductive Versus Inductive Reasoning

Finally, using the Sherlock Holmes versus Watson paradigm the data mining module 500 will use deductive reasoning exclusions that attenuate content with confounding variables in order to stabilize and reduce sensitivity parameter variations due to the environment. Now, we can paraphrase Sherlock Holmes having him say "Elementary my dear Watson, if we eliminate using deductive reasoning the confounding elements of the search, as improbable as it may seem will simplify and elucidate the exact path that yields the final destination 299." FIG. 19D the user use the data mining module 500 to figure out the personal input 99 that elucidates the optimal content and thus using deductive reasoning solves the command instruction 95 or D5 has the optimal dataset 350 that yields the final destination 299.

Direct Searches End the Randomly Surfing the Web Process

Once input maps and directly plots static or dynamic output the search process is over and is displayed on the user's browser 10.

Figure 20:
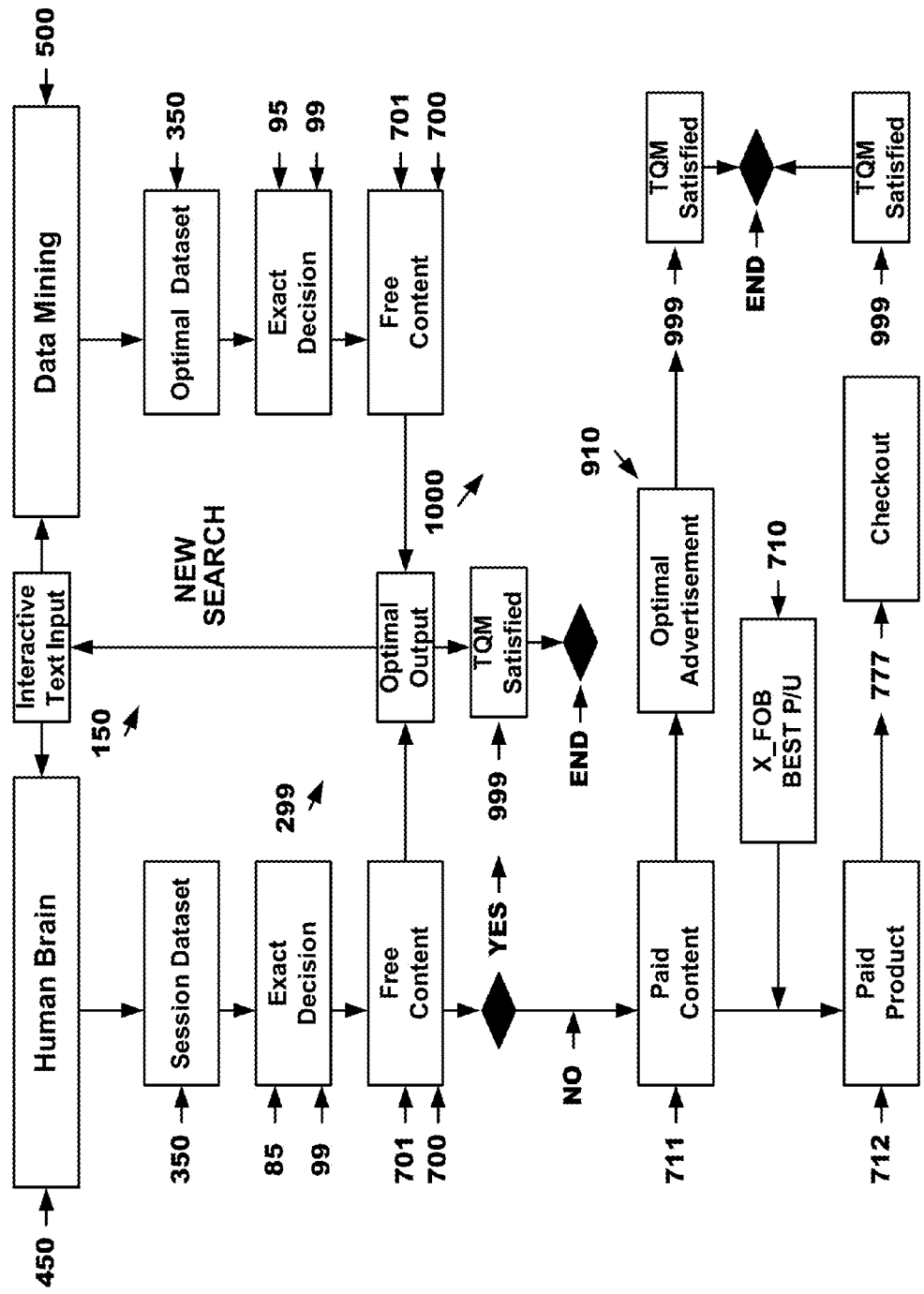
FIG. 20 presents a block flow diagram of the X_FOB method.

FIG. 20 presents a block flow diagram of the X_FOB method. The human brain module 450 and the data mining module 500 after each valid search 150 command instruction determine corresponding assisted input [Bx] now session dataset 350, and the smart input [Cx] after the optimal dataset 350. Both the human brain module 450 and the data mining module 500 interacts with the user until personal input 99 containing an exact decision 85 or 95 is encountered that yields the final destination 299. If the final destination is determined to be free content 701, the search engine optimizer system 1000, displays the optimal output and the user is TQM Satisfied 999 and the search process either continues with a new search or ends.

When the content is deemed to be a purchase, then sales module 700 offers the X_FOB 710, once the system knows the destination of FOB pickup location. Paid content 702 can be provide using the revenues of the advertisement module 910, the sales module 700 will display the advertisement and use the revenues to pay for the viewing of the intellectual property such as a copyrighted video of the user's favorite musical band, once the display is done the user is TQM Satisfied 999 and the search process either continues with a new search or ends.

When the content is a download product purchase, the sales module 700 will begin a X_FOB 710 best price/unit search, and perform the financial transaction upon receiving the checkout 777 command instructions the user is TQM Satisfied 999 and the search process either continues with a new search or ends.

Figure 21:
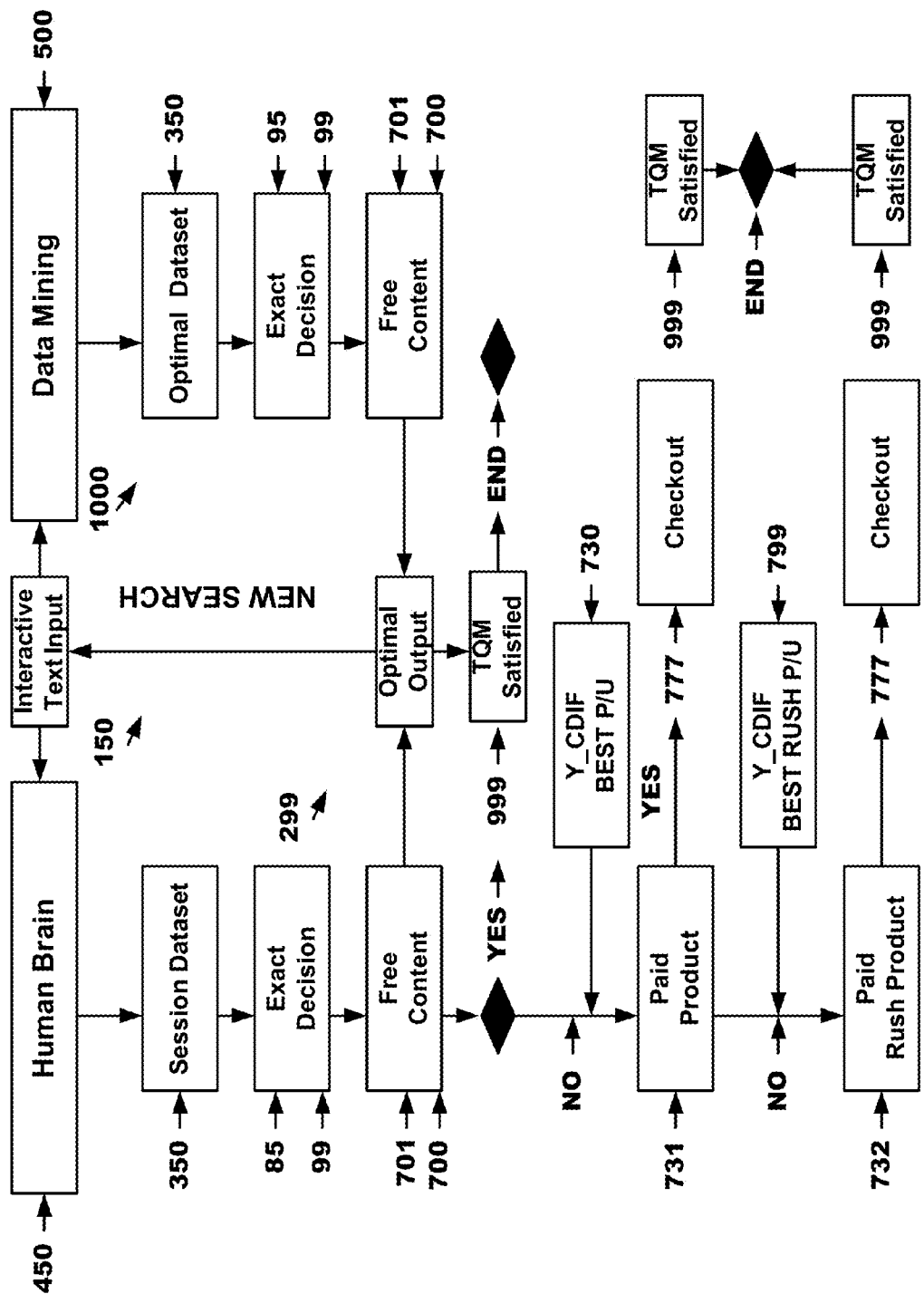
FIG. 21 presents a block flow diagram of the Y_CDIF method.

FIG. 21 presents a block flow diagram of the Y_CDIF method. The human brain module 450 and the data mining module 500 after each valid search 150 command instruction determine corresponding assisted input [Bx] now session dataset 350, and smart input [Cx] after the optimal dataset 350. Both the human brain module 450 and the data mining module 500 interacts with the user until personal input 99 containing an exact decision 85 or 95 is encountered that yields the final destination 299. If the final destination is determined to be free content 701, the search engine optimizer system 1000, displays the optimal output and the user is TQM Satisfied 999 and the search process either continues with a new search or ends.

When the content is deemed to be a paid product that requires shipping, insurance, freight, then sales module 700 offers the Y_CDIF 730, once the system knows legs (A+B). The user interacts with sales module 700, until the checkout command instruction 777 is received, and the transaction is executed and the user is TQM Satisfied 999 and the search process either continues with a new search or ends.

When the content is deemed to be an emergency paid product and time and not price is the primary variable that requires shipping, insurance, freight, then sales module 700 offers RUSH Y_CDIF 799, once the system knows legs (A+B). The user interacts with sales module 700, until the checkout command instruction 777 is received, and the transaction is executed and the user is TQM Satisfied 999 and the search process either continues with a new search or ends.

Figure 22:
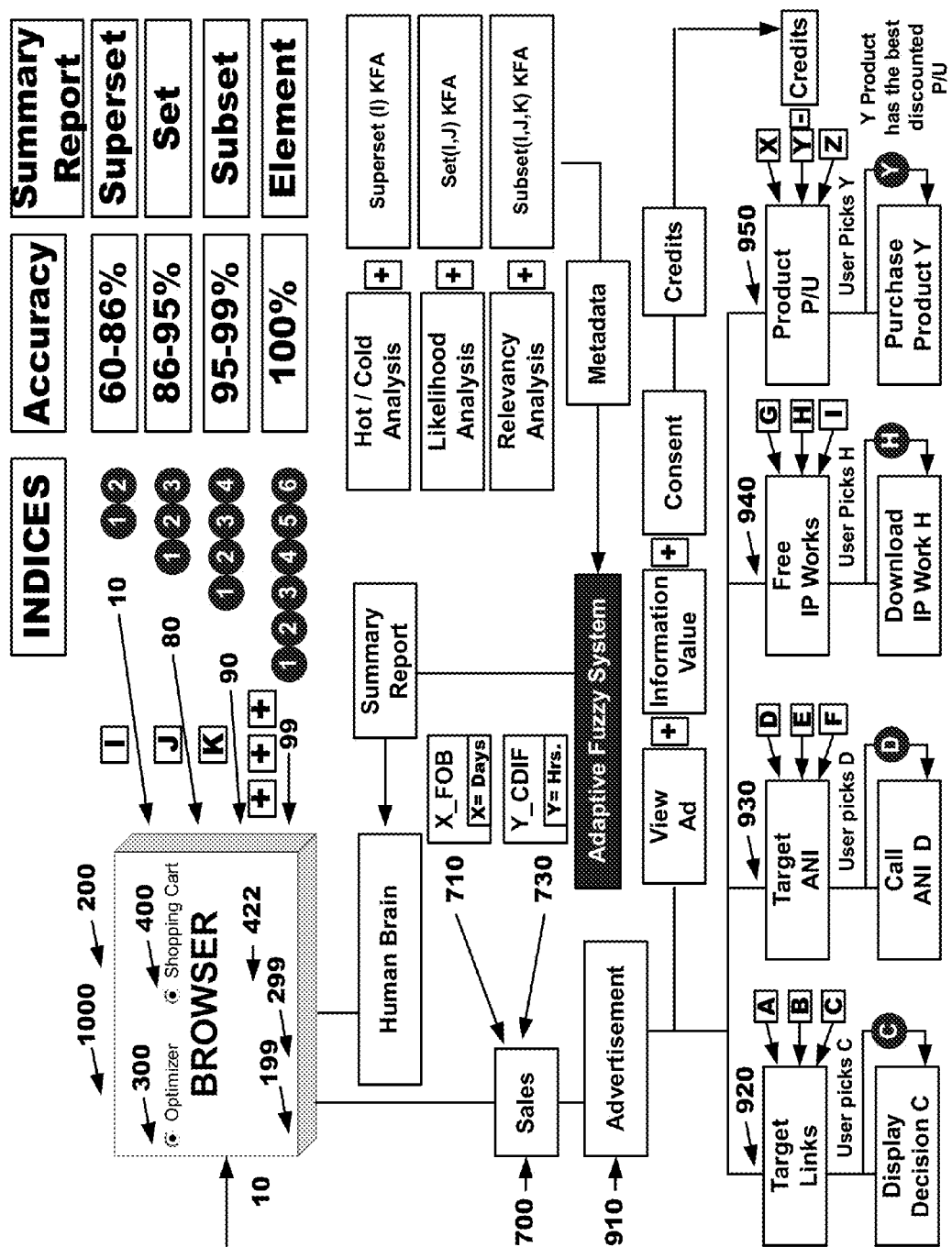
FIG. 22 presents a block flow diagram advertisement module.

FIG. 22 presents a block flow diagram advertisement module. The search engine optimizer system 1000 uses optimizer system 300 and shopping cart system 400 to gather from the end user's browser interactive, assisted, smart and personal input (10, 80, 90, 99).

Interactive input 10 has 1 or 2 managerial relationship indices to solve for a Superset (I) with top results 199 having an accuracy of 60% when having a single index and 86% when having two indices. Assisted input 80 has 2 or 3 managerial relationship indices to solve for a Set (I, J) with top results 199 having an accuracy of 86% when having two indices and 95% when having three indices. Smart input 90 has 3 or 4 managerial relationship indices to solve for a Subset (I, J, K) with top results 199 having an accuracy of 95% when having three indices and 99% when having four indices. Personal input 99 yielding a checkmate combination with 6 managerial relationship indices that automatically yields a final destination 299 having an accuracy of 100%.

All Superset (I), Set (I,J), Subset (I,J,K) have their own unit object in the superset of regular expression chain of command, and when requested display the summary report object, that contains the top (n) results of the particular improved environment, and also the key featured association and feedback equations that permit deductive reasoning analysis.

Superset (I) Expansions

Each Superset (I) can have a plurality of subordinates by using combinations of key featured associations acting as independent variables (J) and (K) sub filters each possessing their own unit object. For example, the searchable environment or Superset (U) can be subdivided by country domains, language or quadrants [[LL, LR, RL, and RR]] based on the human brain equations.

Set (I, J) Expansions

Each Set (I,J) can have a plurality of subordinates by using combinations of key featured associations acting as independent variables (I) (when null) and (K) sub filters each possessing their own unit object. For example, the Battle of Gettysburg event can be part to Superset ("Historical Battles") or to Superset ("American Civil War").

Set (I, J) Expansions

Each Subset (I, J, K) can have a plurality of subordinates by using combinations of key featured associations acting as independent variables (I, J) (when null) sub filters each possessing their own unit object. For example, the 33160 event can be part to Superset ("Florida") or to Superset ("Restaurants") and Set ("Florida","Restaurant") and so forth . . . .

The sales module 700 and advertisement module 910 collaborate to offer the X_FOB module 710 and Y_CDIF 730 to enable interaction between the end user and corporate sponsors. The search engine optimizer system 1000 simulates the human brain by performing the hot/cold analysis upon detecting a Superset (I) object, Relevancy analysis upon detecting a Set (I, J) object and the Likelihood analysis upon detecting a Subset (I, J, K) object. For each identifiable Superset, Set and Subset object the search engine optimizer 1000 and deductive reasoning search engine 200 creates metadata and stores the human brain equation use both left brain [L] equation English language key featured associations, and right brain [R] equation geospatial key featured association, and then gain factors the top results 199, and then using deductive reasoning feedback glyphs equation 422 or N1 that attenuates content with confounding variables in order to stabilize and reduces sensitivity parameter variations due to the environment as being an evolving fuzzy system.

The evolving fuzzy system can be describes as: (EFS) can be defined as self-developing, self-learning fuzzy rule-based or neuro-fuzzy systems that have both their parameters but also (more importantly) their structure self-adapting on-line.

They are usually associated with streaming data and on-line (often real-time) modes of operation. In a narrower sense they can be seen as adaptive or evolving fuzzy systems. The difference is that evolving fuzzy systems assume on-line adaptation of system structure in addition to the parameter adaptation, which is usually associated with the term adaptive or evolving. They also allow for adaptation of the learning mechanism. Therefore, evolving assumes a higher level of adaptation.

Metadata can be describes as: "is structured information that describes, explains, locates, or otherwise makes it easier to retrieve, use, or manage an information resource. Metadata is often called data about data or information about information." "An important reason for creating descriptive metadata is to facilitate discovery of relevant information. In addition to resource discovery, metadata can help organize electronic resources, facilitate interoperability and legacy resource integration, provide digital identification, and support archiving and preservation."

Metadata serves the same functions in resource discovery as good cataloging does by allowing resources to be found by relevant criteria; identifying resources; bringing similar resources together; distinguishing dissimilar resources and giving location information."

The search engine optimizer system 1000 using summary reports objects derived from the Evolving Fuzzy system metadata and human brain equation can now offer and display with the highest precision advertisement that satisfy the end user and thus yield direct sales.

The advertisement module 910 uses the metadata from interactive, assisted, smart and personal input (10, 80, 90, 99) summary report objects 299 to figure out the best target links 920, target ANI 930, targeted advertisements 940 to view free content, valorized optimal advertisements 950 to view and make consent or advertisement decisions that permit the sharing of information with corporate sponsor and in turn receive credits or currency to view, download or purchase intellectual property audio, digital and video works for free or at a discounted price.

The shopping cart system 400 offering a list of target links 920 and billing the corporate link owner upon detecting the command instruction decision to display the link. For example, the end user is shown a list of corporate sponsor links (A, B, C). End user selects command instruction C, sending the user to corporate sponsor link C. The advertisement module 910 now bills corporate sponsor C, for performing the targeted advertisement.

The shopping cart system 400 offering a list of target ANI 930 and billing the corporate ANI owner upon detecting the command instruction decision that instantiates a call. For example, the end user is shown a list of corporate sponsor ANI or telephone numbers (D, E, F). End user selects command instruction D, now a call is instantiate between end user (origin) and corporate ANI D (destination). The advertisement module 910 now bills corporate sponsor D, for performing the targeted telephone call.

The shopping cart system 400 offering a list of links with free IP works 940 and bills the Site owner upon detecting the command instruction decision to display the link. For example, the end user is shown a list of corporate sponsors that will pay for a free view, listen and/or download of a licensed IP digital, audio or video work (G, H, I). End user selects command instruction H, views the corporate sponsor H advertisement. The advertisement module 910 now bills corporate sponsor H, for showcasing their advertisement, and the end user can freely view, listen and/or download the licensed IP digital, audio or video work that corporate sponsor H purchased.

The shopping cart system 400 offering a list of valorized optimal advertisement 950 with a list of available discount prices upon using coupons, watching sponsored advertisement, and or sharing personal information with corporate sponsor using X_FOB 710 and Y_CDIF 730 methods. For example, the end user is shown a list of corporate sponsors that will pay for a free view, listen and/or download of a licensed IP digital, audio or video work (X, Y, Z). End user selects command instruction Y, views the corporate sponsor Y advertisement. The advertisement module 910 now bills corporate sponsor Y, for showcasing their advertisement, and the end user can freely view, listen and/or download the licensed IP digital, audio or video work that corporate sponsor Y purchased.

At this point, the end user decides to purchase the product that paid for the free license. Instantiating a transactional advertisement and the end user will receive further credits should they consent to share information with corporate sponsor X. The shopping cart system 400 will negotiate for the best P/U, and request for additional licensing credits based on the sale. Let us suppose, corporate sponsor X campaign credits the end user with 50 cents for viewing their advertisement, and may credit the end user up to 1 dollar depending on the amount of shared information while filling a survey. Now, then what if the end user decides to purchase one hundred (100) products, and due to the dollar amount of the sale the user may wind up receiving shipping and handling free, supplement credits to purchase more licensed IP digital, audio or video works, and of course a better P/U. The shopping cart system 400 in this case can document that corporate sponsor X advertisement was displayed, and as a direct consequence the end user consented to purchase 100 products from corporate sponsor X. The advertisement module 910 and the sales module 700 collaborated in performing a documented transactional advertisement.

Figure 23:
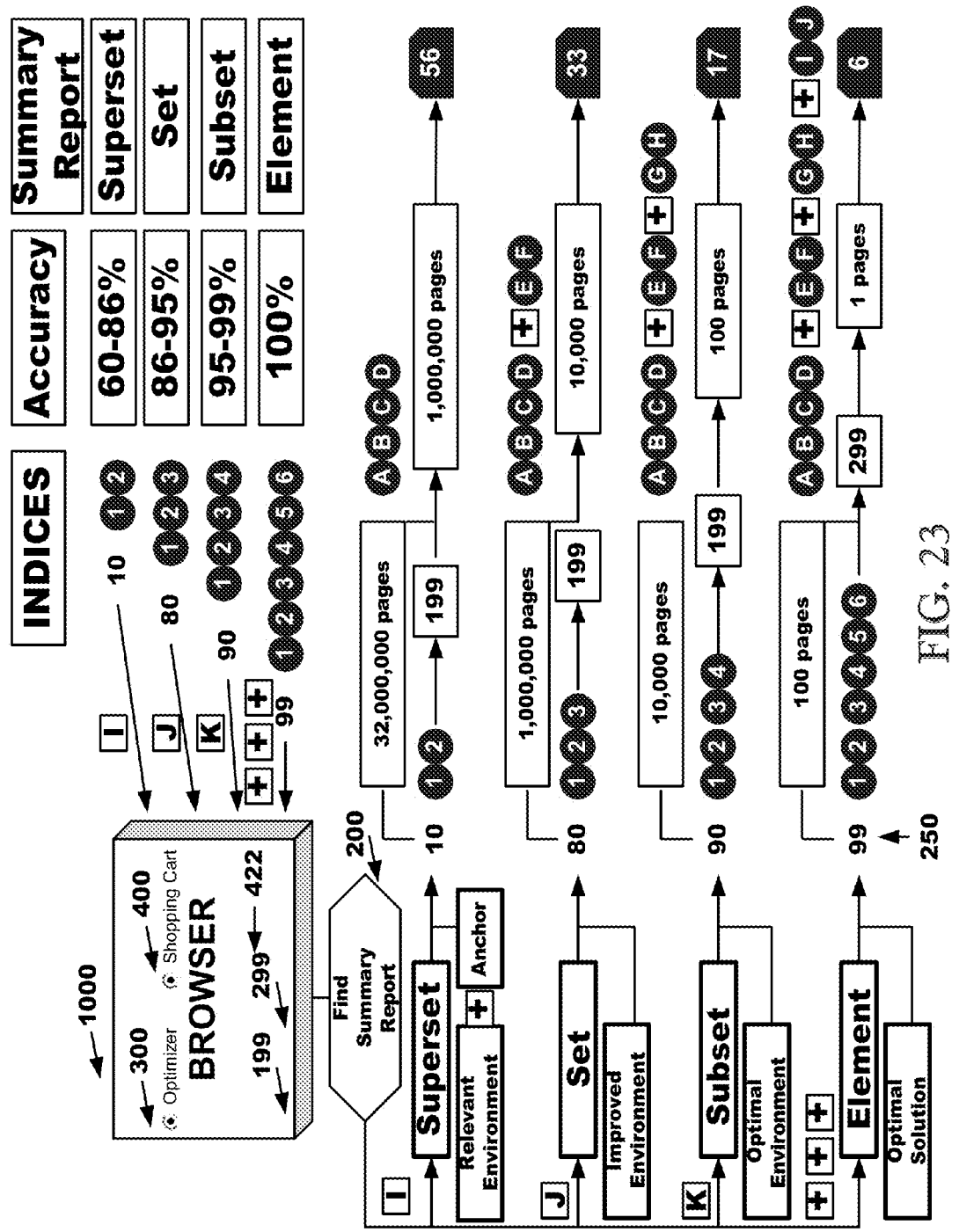
FIG. 23 presents an exemplary of summary report objects.

FIG. 23 presents a block flow diagram of summary report objects the search engine optimizer system 1000, working in conjunction with a deductive reasoning search engine 200 continuously scan, scan and gather the environment. In this case, the searchable environment is the Internet, that the human brain organizes and the right side of the brain partitions the searchable environment into a plurality of super blocks, blocks, sub blocks, mini blocks and elements, whereas the left side of the brain performs the same task using rules of linguistics based on the frequency and direct relationships between keywords and term clusters.

Using the end user browser the optimizer system 300 and shopping cart system 400 and to scan and gather from the end user's browser interactive, assisted, smart and personal input (10, 80, 90, 99). The mimicking the human brain to simulate deductive reasoning to create a language based equation, a geospatial based decision, a human decision equation to interpret numerical and text data and convert the interpreted data into statistical glyphs objects representing the mathematical equation used to determine the optimal partition of the Internet.

At this point, the Deductive reasoning search engine 200 or optimizer system 300 based on the number of indices find the best-fit summary report object. Each request has a Dominant tendency of the brain and an anchor that binds the final destination to a relevant environment comprising of 1 billion pages, and is a partition of the Internet search environment that has a 1 trillion pages.

The anchor filters the relevant environment comprising Interactive input 10 to map Superset (I) with 32,000,000 pages having an accuracy of 60%, and then the primary index relationship (I) solves for the top results 199 after creating an improved environment comprising of 1 million pages, and is a partition of the relevant and searchable environments.

Using the secondary index relationship (J) Assisted input 80 filters the improved environment map Set (I, J) with 10,000 pages having an accuracy of 95% and solves for the top results 199 after creating an optimal environment.

Using a right side of the brain checkmate combination (K) Smart input 90 filters the optimal environment to map Subset (I, J, K) with 100 pages having an accuracy of 99% and solves for the top results 199 after creating an optimal solution.

Using both a left and right side of the brain checkmate combination (+++) personal input 99 filters the optimal solution having an accuracy of 100% and solves for the final destination 299.

The logic basis to finding the top results 199 within the relevant environment is 99, improved environment is 56, optimal environment is 33, optimal solution is 17 and optimal element is 6. Note: the searchable environment is 305

In conclusion interactive input 10, assisted input 80 and smart input 90 intrinsically have confounding elements that hide the final destination 299. The Hot/Cold, Likelihood and Relevancy analyses figure out key featured association of the mathematical equation that gain factor measured quality of pages and thus improves the precision of the search to 95% accuracy.

To reach 100% accuracy and precision the confounding elements of the search must be eliminated. The optimizer 300 and shopping cart 400 systems allows the user to select personal input 99 containing exact decisions 95 that create direct search 250. Each direct search 250 uses deductive reasoning means of the feedback glyphs equation 422 or N1 that attenuates content with confounding variables in order to stabilize and reduces sensitivity parameter variations due to the environment. Direct searches 250 eliminate the randomly surfing the web trial and error process and in turn automatically yields the final destination 299.

The personal Input 99 allows the process to be commercialized permitting the shopping cart system 400 to put buyers and sellers together. At this point, free content and downloads are immediately, sent to the end user as output. Otherwise X_FOB 710 decisions and Y_CDIF 730 are made available to the user.

X_FOB decisions, which measures the FOB price per unit of merchandise being made available through ocean and land transportation means to its physical warehouse originating from participating retailers, wholesalers and suppliers where time is measured in X days dimensions and thus the term X_FOB.

Y_CDIF decisions, which measures the CDIF (cargo duties insurance freight) P/U of forecasted inventory in hand merchandise through air transportation means and door to door services to the end user and time is measured in Y hours dimensions and thus the term Y_CDIF;

The shopping cart system 400 storing 'The Price' summary reports and pronounced 'the price' and thus the term Z_PRICE, by using X days dimensions X_FOB calculations and Y hour dimension Y_CDIF calculations based on said inventory control of "In Hand" and domestic rush FOB, and also purchasing forecasted inventories lots based on demand, economies of scale, historical trends and storage capacities.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method of determining and presenting at least one optimal web page based upon submitted search criteria, the method comprising steps of:

(A) accessing an evolving system through an Internet, said evolving system comprising an evolving system computing device executing evolving system software, wherein said evolving system software is stored on a evolving system non-transitory computer readable media, wherein said evolving system computing device is in signal communication with said evolving system non-transitory computer readable media, where said evolving system computing device interacts with a data entry computing device executing browser software, wherein said browser software is stored on a data entry device non-transitory computer readable media, wherein said data entry computing device is in signal communication with said data entry device non-transitory computer readable media, and a search engine supercomputer executing search engine software, wherein said search engine software is stored on a search engine non-transitory computer readable media, wherein said search engine supercomputer is in signal communication with said search engine non-transitory computer readable media, wherein said end user computing device is in digital signal communication with said search engine supercomputer and said search engine supercomputer is in digital signal communication with an Internet and said non-transitory computer readable media;

(B) establishing a human knowledge database, wherein said human knowledge database comprises a series of commonly known subject matter reference indices, said human knowledge database residing on a digital memory storage device, wherein said human knowledge database is stored on a human knowledge database digital memory storage device, wherein said human knowledge database digital memory storage device is in digital data communication with said evolving system computing device;

(C) refining said human knowledge database and a complete superset of potential keyword expressions into summary report objects to enable optimal searching, wherein said step of refining is accomplished by said evolving system computing device executing said evolving system software;

(D) submitting at least one search request through said data entry computing device executing said browser software;

(E) performing informatics set theory constructs to offer at least one command instruction to eliminate confounding variables from the personalized word search;
(F) identifying a series of selectable series of command instructions based upon said submitted series of words, wherein the step of identifying is accomplished by said evolving system computing device executing said evolving system software;
(G) presenting said series of selectable series of command instructions to said end user;
(H) selecting at least one of said selectable series of command instructions, wherein said step of selecting at least one of said selectable series of command instructions is accomplished by an input from said user;
(I) receiving an instruction from said user directing a modification to said personalized word search in accordance with said instruction entered by said user;
(J) repeating said series of steps of identifying said series of selectable series of command instructions and said user defined entries to further refine said series of selectable series of command instructions until said user reaches a final decision.

2. The method from claim 1, further comprising steps of:
executing a set of informatics set theory constructs enabling command instructions decisions which offer online purchase of licensed digital media works, the step of executing being accomplished by said evolving system computing device executing said evolving system software based upon said final decision;
performing online purchases of licensed digital media works by corporate sponsors on behalf of said user as a compensation for viewing at least one commercial offering, wherein said step of performing online purchases is accomplished by said server executing said software instructions;
offering target links, wherein said step of offering target links is accomplished by said server executing said software instructions; and
performing a financial transaction triggered by end user's decision to view a commercial offering, wherein said step of performing said financial transaction is accomplished by said server executing said software instructions.

3. The method of claim 1, further comprising a step of:
executing a purchase order containing pricing data enabling billing to commence the moment the financial resources are made available, wherein said step of executing said purchase order is accomplished by said server executing said software instructions.

4. The method of claim 1, further comprising steps of:
determining inventory on hand for at least one supplier, wherein said inventory on hand is based upon said user's final decision; and
generating a purchase order based upon said determined inventory on hand, wherein said step of generating said purchase order is accomplished by said server executing said software instructions utilizing information obtained from said user's final decision.

5. The method of claim 1, further comprising a step of:
searching a plurality of websites to determine the best freight on board (FOB) prices from at least one supplier, wherein said step of searching to determine the best FOB prices is accomplished by said server executing said software instructions utilizing information obtained from said user's final decision.

6. The method of claim 1, further comprising a step of:
searching a plurality of websites to determine the best cargo and freight (C&F) pricing from at least one supplier to a predetermined destination, wherein said step of searching to determine the best C&F pricing is accomplished by said server executing said software instructions utilizing information obtained from said user's final decision.

7. The method of claim 1, further comprising a step of:
searching a plurality of websites to determine the best cargo duties insurance freight (CDIF) pricing from at least one supplier to a predetermined destination, wherein said step of searching to determine the best CDIF pricing is accomplished by said server executing said software instructions utilizing information obtained from said user's final decision.

8. The method of claim 1, further comprising a step of:
searching a plurality of websites to determine the best cargo transportation pricing from at least one supplier to a predetermined destination, wherein said cargo transportation pricing is based upon ocean transportation and ground transportation, wherein said step of searching to determine the best cargo transportation pricing is accomplished by said server executing said software instructions utilizing information obtained from said user's final decision.

9. The method of claim 1, further comprising a step of:
searching a plurality of websites to determine the best cargo transportation pricing from at least one supplier to a predetermined destination, wherein said cargo transportation pricing is based upon express air transportation, wherein said step of searching to determine the best cargo transportation pricing is accomplished by said server executing said software instructions utilizing information obtained from said user's final decision.

10. The method of claim 1, further comprising a step of:
searching a plurality of websites to determine the best product prices and availability from at least one supplier, wherein said step of searching to determine the best product prices and availability is accomplished by said server executing said software instructions.

11. The method of claim 1, further comprising steps of:
transporting merchandise from a first location to a second location, wherein said transportation is accomplished using at least one of an ocean transportation vessel and a ground transportation vehicle; and
offering for sale said merchandise while being transported from said first location to said second location.

12. The method of claim 1, further comprising a step of:
fulfilling a portion of a complete order established by said purchase order, wherein said step of fulfilling a portion of a complete order is accomplished by directing shipment of said portion of said complete order, said step of directing shipment of said portion of said complete order is accomplished by said server executing said software instructions.

13. The method of claim 12, further comprising steps of:
obtaining a rush priority for a portion of a purchase order, wherein said end user establishes and defines said rush priority; and
determining an optimal solution to fulfill said portion of said complete order using time-cost constraints to derive an optimal solution, wherein said step of determining said optimal solution is accomplished by said server executing said software instructions.

14. The method of claim 1, further comprising a step of:

displaying at least one advertisement offering credit from at least one sponsor, wherein said step of displaying at least one advertisement is accomplished by said server executing said software instructions utilizing information obtained from said user's final decision.

15. The method of claim 14, further comprising steps of:

selecting one of said at least one advertisement offer, wherein said offer includes credits to purchase licensed digital media works; and executing said selected advertisement offer, wherein said step of executing said selected advertisement offer is accomplished by said server executing said software instructions.

16. The method of claim 1, further comprising steps of:

displaying at least one target link from at least one corporate sponsor, wherein said step of displaying at least one target link is accomplished by said server executing said software instructions utilizing information obtained from said user's final decision;

selecting one of said at least one target link; and redirecting said user to said selected target link, wherein said step of redirecting said user to said selected target link is accomplished by said server executing said software instructions.

17. The method of claim 1, further comprising steps of:

displaying at least one target automatic number identification (ANI) from at least one corporate sponsor, wherein said step of displaying at least one target ANI is accomplished by said server executing said software instructions utilizing information obtained from said user's final decision;

selecting one of said at least one target ANI; and initiating a call to said selected target ANI, wherein said step of initiating a call to said selected target ANI is accomplished by said server executing said software instructions.

18. The method of claim 1, further comprising a step of:

issuing credits to a user's credit account upon completion of a financial transaction, wherein said step of issuing credits to a user's credit account is accomplished by said server executing said software instructions.

19. The method of claim 1, further comprising steps of:

determining suitable target links from at least one corporate sponsor, wherein said determination is based upon at least one of supply side economics and bids, wherein said step of determining suitable target links is accomplished by said server executing said software instructions utilizing information obtained from said user's final decision;

displaying said suitable target links, wherein said step of displaying said suitable target links is accomplished by said server executing said software instructions;

selecting one of said suitable target links; and redirecting said user to said selected suitable target link, wherein said step of redirecting said user to said selected suitable target link is accomplished by said server executing said software instructions.

20. The method of claim 1, further comprising steps of:

determining at least one suitable automatic number identification (ANI) at least one corporate sponsor, wherein said determination is based upon at least one of supply side economics and bids, wherein said step of determining suitable target links is accomplished by said server executing said software instructions utilizing information obtained from said user's final decision;

displaying said suitable ANI links, wherein said step of displaying said suitable ANI links is accomplished by said server executing said software instructions;

selecting one of said at least one suitable target ANI; and initiating a call to said selected target ANI, wherein said step of initiating a call to said selected target ANI is accomplished by said server executing said software instructions.

21. A method of determining and presenting at least one optimal web page based upon submitted search criteria performed by one or more computers, wherein the method cleans, standardizes, and organizes the networked environment to achieve informational certainty by load balancing information into a managerial hierarchical structured computer network absent of redundancy, latency and burden, the method comprising steps of:

(A) accessing a computer network in digital communication with an Internet, said computer network comprising: a search engine operated on a networked search engine host computer, a browser enabled computing device in digital signal communication with a browser enabled computing device computer-readable non-transitory data storage media and said networked search engine host computer, said computing device operating an interactive data entry browser software, wherein said interactive data entry browser software resides on said browser enabled computing device computer-readable non-transitory data storage media;

(B) executing informatics set theory construct to transform valid interactive input regular expressions into a personalized word search that is communicated to said search engine;

(C) establishing a human knowledge database executing a set of human knowledge software instructions in order to simulate a complete superset of known subject matter reference indices belonging to said personalized word search construed during an Internet browser search; wherein said step of refining is accomplished by at least one of said networked search engine host computer and said browser enabled computing device that is in digital communication with the Internet executing informatics set theory constructs to process the impact of each said personalized search pattern to create summary report objects to enable optimal searching;

(D) submitting said personalized word search through said interactive data entry browser software residing in said browser enabled computing device to eliminate confounding variables; wherein the step of eliminating confounding variables is accomplished by at least one of said networked search engine host computer and said browser enabled computing device performing informatics set theory constructs upon search said human knowledge database and finding a match;

(E) identifying a series of selectable series of command instructions based upon said personalized word search, wherein said step of identifying is accomplished by at least one of said networked search engine host computer and said browser enabled computing device upon searching said human knowledge database and finding a match;

(F) presenting said series of selectable series of command instructions to said end user; wherein said step of presenting at least one of said selectable series of command instructions is accomplished by said browser enabled computing device;

(G) receiving an instruction from said user directing a modification to said personalized word search in accordance with said instruction entered by said user; wherein repeating said series of steps of presenting selectable series of command instructions until said user personalized word search finalized a decision and said process is prepared to complete a financial transaction; and (H) initiating and completing said financial transaction respective to said selected command instructions.

22. A method of determining and presenting at least one optimal web page based upon submitted search criteria performed by one or more computers, wherein the method cleans, standardizes, and organizes the networked environment to achieve informational certainty by load balancing information into a managerial hierarchical structured computer network absent of redundancy, latency and burden, the method comprising steps of:

(A) accessing a computer network in digital communication with an Internet, said computer network comprising: a search engine operated on a networked search engine host computer, a browser enabled computing device in digital signal communication with a browser enabled computing device computer-readable non-transitory computer readable media data storage media and said networked search engine host computer, said computing device operating an interactive data entry browser software, wherein said interactive data entry browser software resides on said browser enabled computing device computer-readable non-transitory data storage media;

(B) executing informatics set theory construct to transform valid interactive input regular expressions into a personalized word search that is communicated to said search engine;

(C) establishing a human knowledge database executing a set of human knowledge software instructions in order to simulate a complete superset of known subject matter reference indices belonging to said personalized word search construed during an Internet browser search; wherein said step of refining is accomplished by at least one of said networked search engine host computer and said browser enabled computing device that is in digital communication with the Internet executing informatics set theory constructs to process the impact of each said personalized search pattern to create summary report objects to enable optimal searching;

(D) identifying a series of selectable series of command instructions based upon said personalized word search, wherein said step of identifying is accomplished by at least one of said networked search engine host computer and said browser enabled computing device upon searching said human knowledge database and finding a match;

(E) submitting a series of words into a search request through interactive data entry browser software residing in said computing device;

(F) identifying a series of selectable series of command instructions based upon said submitted series of words, wherein the step of identifying is accomplished by said computer network computing device executing said system software interactive data entry browser software;

(G) presenting said series of selectable series of command instructions to said end user; wherein said step of presenting at least one of said selectable series of command instructions is accomplished by obtaining a finalized decision personalized word search through said browser enabled computing device from said user;

(H) obtaining a selected finalized decision personalized word search from said user through said browser enabled computing device; and (I) receiving an instruction from said user directing a modification to said personalized word search in accordance with said instruction entered by said user;

(L) receiving said finalized decision personalized word search in accordance with said instruction entered by said user to initiate and complete a financial transaction respective to said selected command instructions.

* * * * *